United States Patent

Morita et al.

(10) Patent No.: US 6,624,975 B2
(45) Date of Patent: Sep. 23, 2003

(54) MAGNETIC TAPE CARTRIDGE HAVING PROJECTIONS

(75) Inventors: Kiyoo Morita, Kanagawa-ken (JP); Daisuke Takahashi, Kanagawa-ken (JP); Yusuke Ishihara, Kanagawa-ken (JP); Hideaki Shiga, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/173,411

(22) Filed: Jun. 18, 2002

(65) Prior Publication Data

US 2003/0039072 A1 Feb. 27, 2003

Related U.S. Application Data

(62) Division of application No. 09/700,469, filed as application No. PCT/JP99/02372 on May 7, 1999.

(30) Foreign Application Priority Data

May 15, 1998 (JP) .......................................... 10-133544

(51) Int. Cl.⁷ ........................ G11B 23/107; G11B 23/02
(52) U.S. Cl. ..................................................... 360/132
(58) Field of Search ............................... 360/132, 96.5, 360/95; 242/326.2, 194, 198, 195; 206/387, 387.1, 307.1, 308.1; 369/291

(56) References Cited

U.S. PATENT DOCUMENTS

| | | | |
|---|---|---|---|
| 1,288,610 A | 12/1918 | Jones | |
| 3,391,824 A | 7/1968 | Wiseman | |
| 3,672,603 A * | 6/1972 | Swain | 360/132 |
| 4,069,914 A | 1/1978 | Damsky | |
| 4,477,851 A * | 10/1984 | Dalziel et al. | 360/132 |
| 4,703,853 A | 11/1987 | Byrns | |
| 5,006,038 A | 4/1991 | Leben | |
| D336,613 S | 6/1993 | Zutler | |
| 5,341,926 A | 8/1994 | Leben | |
| 5,507,389 A | 4/1996 | Syrek | |
| 5,539,599 A | 7/1996 | Wilder | |
| 5,631,791 A * | 5/1997 | Osaki et al. | 360/132 |
| 6,034,850 A | 3/2000 | Del Genio et al. | |

FOREIGN PATENT DOCUMENTS

| | | | | |
|---|---|---|---|---|
| JP | 48-70535 | | 9/1973 | |
| JP | 01-217780 | * | 8/1989 | .......... G11B/23/03 |
| JP | 2-195583 | | 8/1990 | |
| JP | 5-33382 | | 4/1993 | |
| JP | 5-96965 | | 12/1993 | |
| JP | 8-161847 | | 6/1996 | |
| JP | 2000-011594 | * | 1/2000 | .......... G11B/23/107 |
| KR | 19900008095 B1 | | 10/1990 | |

* cited by examiner

Primary Examiner—George J. Letscher
Assistant Examiner—Christopher R Beacham
(74) Attorney, Agent, or Firm—Sughrue Mion, PLLC

(57) ABSTRACT

In a magnetic tape cartridge comprising a thin cartridge casing having flat upper and lower surfaces and a single reel which is housed in the cartridge casing for rotation and around which a magnetic tape is wound, island-like or point-like projections are provided at least three places of the lower surfaces of the cartridge casing near the leading edge and the trailing edge of the cartridge casing as viewed in the direction X of insertion of the magnetic tape cartridge in a recording and reproducing apparatus and recesses which are adapted to be engaged with the projections are provided on the upper surface of the cartridge casing so that, when a plurality of the magnetic tape cartridges are stacked, the projections and the recesses of the cartridge casings of magnetic tape cartridges which are just above and below each other are engaged with each other, whereby the magnetic tape cartridges are prevented from being displaced with respect to each other when a plurality of magnetic tape cartridges are stacked and the sliding resistance when the magnetic tape cartridge is inserted into a recording and reproducing apparatus is reduced.

1 Claim, 23 Drawing Sheets

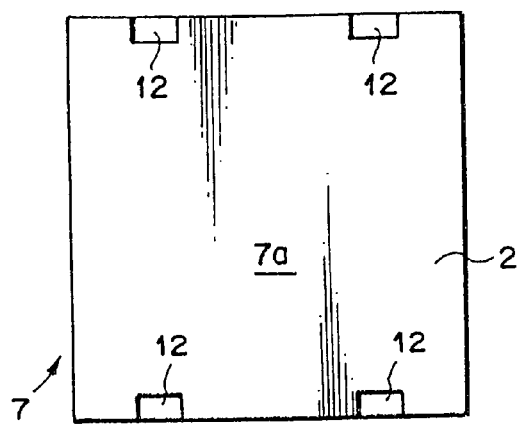
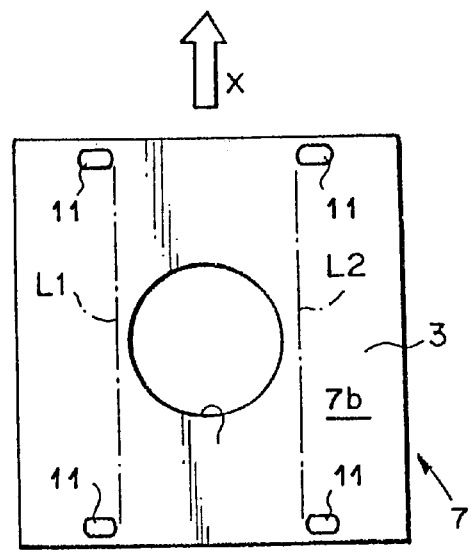
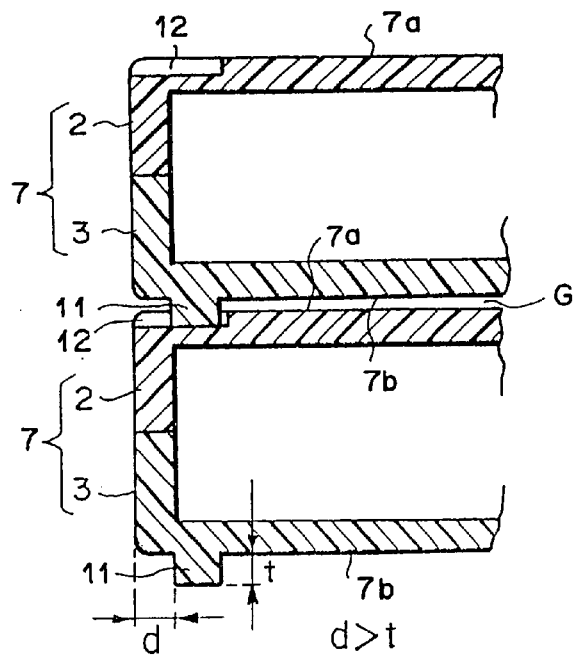

F I G. 23
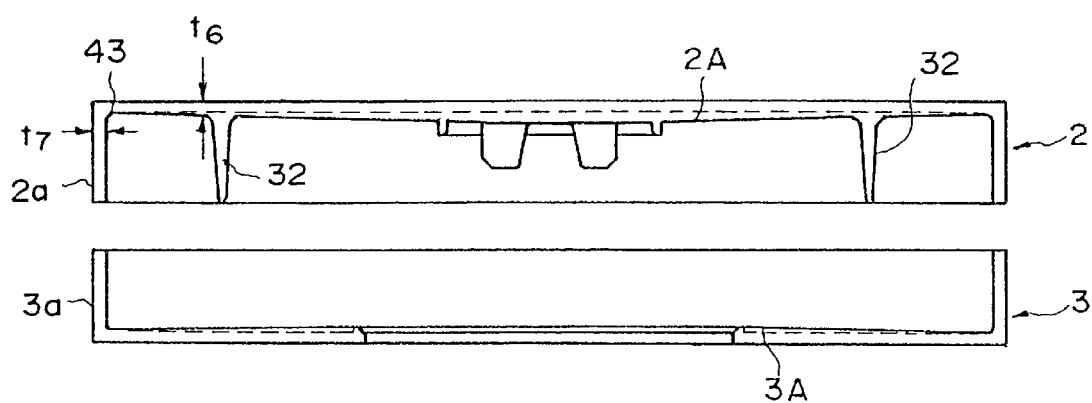

MAGNETIC TAPE CARTRIDGE HAVING PROJECTIONS

This is a divisional of application Ser. No. 09/700,469 filed Nov. 15, 2000 which is a 371 of PCT/JP99/02372 filed May 7, 1999; the disclosure of which is incorporated herein by reference.

FIELD OF THE INVENTION

This invention relates to a one-reel magnetic tape cartridge for use in a computer or the like.

BACKGROUND OF THE INVENTION

As a backup medium for a computer memory, there has been known a magnetic tape cartridge comprising a thin rectangular cartridge casing formed of upper and lower halves fixed together by screws or the like and a single reel which is housed in the cartridge casing for rotation and around which a magnetic tape is wound.

When such a magnetic tape cartridge is loaded in a recording and reproducing apparatus, a drive member of the apparatus is engaged with engagement teeth on the reel exposed through a circular opening formed on the lower half of the cartridge casing at the center thereof and the magnetic tape wound around the reel is drawn out from the cartridge casing into a predetermined position on the tape running path by a tape drawing mechanism of the apparatus, whereby read/write of data becomes feasible.

In such magnetic tape cartridges, conventionally, a projection for stacking is formed on the upper surface of the cartridge casing of each magnetic tape cartridge and a recess for stacking is formed on the lower surface of the cartridge casing of each magnetic tape cartridge so that, when a plurality of magnetic tape cartridges are stacked, the recess for stacking on one magnetic tape cartridge is engaged with the projection for stacking on the upper magnetic tape cartridge, whereby the relative position between the upper and lower magnetic tape cartridges is fixed so that a plurality of magnetic tape cartridges can be transported in a stacked state.

Conventionally, the projection for stacking on the lower surface of the cartridge casing is generally in the form of a pair of protrusions which extend in the direction of insertion of the magnetic tape cartridge into the recording and reproducing apparatus on opposite sides of the circular opening. This arrangement gives rise to a problem that the protrusions are apt to warp and when they warp, the protrusion on each magnetic tape cartridge cannot be stably engaged with the engagement recess of the lower magnetic tape cartridge when a plurality of magnetic tape cartridges are stacked, whereby the magnetic tape cartridges become shaky.

Further, there has been also a problem that the protrusions increase sliding friction when the magnetic tape cartridge is inserted into the recording and reproducing apparatus.

In the magnetic tape cartridge, locator holes for locating the magnetic tape cartridge with respect to the recording and reproducing apparatus are often provided in the bottom wall of the lower half of the cartridge casing. In such a case, bosses each provided with a locator hole extending through the boss are formed on the bottom wall of the lower half at its four corners together with bosses each provided with through holes through which a screw for fastening together the upper and lower halves of the cartridge casing is inserted.

Further, a tape draw-out opening through which the magnetic tape in the cartridge casing is drawn out is formed in the side wall of the cartridge casing near one corner thereof, and a taper leader member is removably held in a space open to the tape draw-out opening between the lower surface of the top wall of the upper half and the upper surface of the bottom wall of the lower half. Accordingly, the tape draw-out opening must be provided with a space for accommodating the tape leader member, a space through which the magnetic tape runs and a space through which a tape draw-out member on the recording and reproducing apparatus is given access to the tape leader member, which greatly limits the space near the tape draw-out opening in which bosses can be provided.

Further, since a circular rib which coaxially surrounds the reel is erected from the upper surface of the bottom wall of the lower half, the space near the tape draw-out opening in which bosses can be provided is further limited and accordingly, the bosses for the locator holes and the screw holes and the circular rib must be provided in contact with each other or close to each other.

However, when the bosses and the rib are formed in contact with each other or close to each other, the part is locally thickened, which makes it difficult to keep a sufficient dimensional accuracy and geometric accuracy of the locator holes when the cartridge casing is molded due to nonuniform cooling in the mold and difference in shrinkage factor. Further, the bosses, the holes and the rib become apt to lean.

Further, when there exists a part at which the wall thickness is extremely large as compared with other parts, there arises fear that sink marks and/or welding lines are generated on the inner surface of the locator hole and the locator hole is disabled from functioning as a locator.

Further, even in the case where the bosses and the rib are in contact with each other but are simply close to each other, the part of the wall of the mold between parts which are close to each other is less apt to be cooled as compared with other parts, and accordingly, it is difficult to keep a sufficient dimensional accuracy and geometric accuracy and the bosses, the holes and the rib become apt to lean.

Further, the magnetic tape cartridge is generally provided with a brake member which locks the reel not to rotate when the magnetic tape cartridge is not being used and a coiled spring which urges the brake member in the direction of the axis of rotation of the reel. Generally the cartridge casing is formed by plastic injection molding. The urging force of the coiled spring can deform outward the top wall and/or the bottom wall of the cartridge casing. When the top wall and/or the bottom wall of the cartridge casing is deformed outward, the cartridge casing can interfere with the reel to obstruct rotation of the reel, location of the magnetic tape cartridge with respect to the recording and reproducing apparatus can become infeasible and/or stacking of the magnetic tape cartridges can be adversely affected.

In order to overcome these problems, the cartridge casing has been formed by molding of a glass-fiber reinforced polycarbonate resin or the like so that the rigidity of the cartridge casing is increased and deformation of the cartridge casing is prevented.

However this approach has been disadvantageous in that the service life of the molds is shortened and wear of the bucket of the recording and reproducing apparatus is increased when the magnetic tape cartridge is loaded in or unloaded from the recording and reproducing apparatus. That is, use of glass fiber reinforcement is not preferred from these viewpoints.

Though the plastic injection molding is useful as a technique for accurately and efficiently forming products of a complicated shape, it gives rise to a problem that a gate mark is left on the surface of the products which can obstruct loading and unloading of the magnetic tape cartridge in and from the recording and reproducing apparatus and can be ground to produce plastic grindings during loading and unloading of the magnetic tape cartridge depending on the position of the gate mark.

When a desired magnetic tape cartridge is taken out from a library and loaded in a recording and reproducing apparatus by a chucking machine or when the magnetic tape cartridge is taken out from the recording and reproducing apparatus and returned to the library by the chucking machine, the gate mark sometimes obstructs stable chucking of the magnetic tape cartridge.

Though these problems can be avoided by disposing the gate in a recess of the surface of the cartridge casing, flow of the resin near the gate becomes low since the wall thickness near the gate becomes smaller due to existence of the recess. As a result, uneven packing of resin is generated near the gate, the end of the flow (e.g., side walls) can sink to deteriorate the dimensional accuracy and, at the worst, short molding can occur due to a poor packing pressure. Though these problems can be avoided by providing a plurality of gates, the approach adds to the cost and is not advantageous.

Further, the problems can be avoided by providing a tunnel gate or a side gate on a side wall or the like of the cartridge casing. However, this approach is disadvantageous in that the length of the path over which the resin flows is elongated and the dimensional accuracy of the product deteriorates.

Further, an arcuate rib is formed on each corner of the upper half to surround the reel. The ends of the arcuate rib merge into side walls of the upper half in tangential directions of the rib. Further, a corner of the upper half is often provided with a cutaway portion for preventing the magnetic tape cartridge from being inserted into the recording and reproducing apparatus in a wrong direction. The cutaway portion is formed, for instance, from the upper surface of the top wall of the upper half halfway of the height of the side wall by cutting the corner of the upper half in a shape like a triangle including a point near the intersection of the arcuate rib and the side wall.

In such a case, the part of the side wall near the intersection forms a recess at an upper part thereof while forming a thick wall portion at a lower portion thereof. The thick wall portion is cooled slower than the surrounding parts, which results in a sinkmark and/or lean in the part near the intersection and a step on the surface to be mated with the corresponding part of the lower half.

SUMMARY OF THE INVENTION

In view of the foregoing observations and description, a first object of the present invention is to provide a magnetic tape cartridge which can be stably stacked with other magnetic tape cartridges and is low in sliding friction when it is inserted into a recording and reproducing apparatus.

A second object of the present invention is to provide a magnetic tape cartridge which is provided with a boss provided with a locator hole extending through the boss and a boss provided with a through hole through which a screw for fastening together the upper and lower halves of the cartridge casing both formed near a tape draw-out opening through which the magnetic tape in the cartridge casing is drawn out, and is yet high both in dimensional accuracy and geometric accuracy of the locator hole.

A third object of the present invention is to provide a magnetic tape cartridge which is rigid enough to prevent expansion or deformation of the cartridge casing by urging force of the spring which urges the brake member and to ensure a sufficient clearance between the reel and the cartridge casing even if the cartridge casing is formed by molding of a plastic material without glass fiber.

A fourth object of the present invention is to provide a magnetic tape cartridge which can be formed by injection molding in such a manner that fine geometric properties can be formed with a high dimensional accuracy with one gate for each product disposed in a position where the gate mark does not interfere with loading and unloading the magnetic tape cartridge in and from the recording and reproducing apparatus and with chucking of the magnetic tape cartridge when the magnetic tape cartridge is taken out from and returned to a library.

A fifth object of the present invention is to provide a magnetic tape cartridge in which the aforesaid drawbacks inherent to the magnetic tape cartridge where an arcuate rib is formed on each corner of the cartridge casing to surround the reel so that their ends merge into side walls of the cartridge casing in tangential directions of the rib and a cutaway portion for preventing the magnetic tape cartridge from being inserted into the recording and reproducing apparatus in a wrong direction is formed on a corner of the cartridge casing can be effectively avoided.

BRIEF DESCRIPTIONS OF THE INVENTION

The first object of the present invention can be accomplished by a magnetic tape cartridge in accordance with a first aspect of the present invention characterized in that island-like or point-like projections are provided at least three places of one of the upper and lower surfaces of the cartridge casing and recesses which are adapted to be engaged with the projections are provided on the other of the upper and lower surfaces of the cartridge casing so that, when a plurality of the magnetic tape cartridges are stacked, the projections and the recesses of the cartridge casings of magnetic tape cartridges which are just above and below each other are engaged with each other to keep the relative position between the magnetic tape cartridges.

That is, when the island-like or point-like projections are provided on the lower surface of the cartridge casing, the recesses are provided on the upper surface of the cartridge casing, and conversely, when the island-like or point-like projections are provided on the upper surface of the cartridge casing, the recesses are provided on the lower surface of the cartridge casing.

The expression "island-like projection" means a projection which is independent of its surroundings and has a small certain area and the expression "point-like projection" means a projection which is independent of its surroundings and has a smaller certain area.

When the projections are provided on the lower surface of the cartridge casing and the recesses are provided on the upper surface of the cartridge casing, it is preferred that the height of the projections be slightly larger than the depth of the recesses so that a slight gap is formed between the lower surface of the upper magnetic tape cartridge and the upper surface of the lower magnetic tape cartridge when a plurality of magnetic tape cartridges stacked with the projections and the recesses engaged with each other.

Further, it is preferred that each of the projections be formed at a predetermined distance d from the edge of the cartridge casing.

Further, it is preferred that the height t of the projections be larger than the distance d.

Further, it is preferred that the projections be formed near the leading edge and the trailing edge of the cartridge casing with respect to the direction of insertion of the magnetic tape cartridge into the recording and reproducing apparatus.

Further, it is preferred that the distance d of the projection from the leading edge or the trailing edge of the cartridge casing satisfies the condition $t<d\leq0.15D$, wherein t represents the height of each projection, and D represents the length of the cartridge casing as measured in the direction of insertion of the magnetic tape cartridge into the recording and reproducing apparatus.

In the case where the projections are provided on the lower surface of the cartridge casing, it is preferred that the projections be formed outside the circular opening, formed in the lower surface of the cartridge casing at the center thereof, with respect to the direction perpendicular to the direction of insertion of the magnetic tape cartridge into the recording and reproducing apparatus.

In the magnetic tape cartridge in accordance with the first aspect of the present invention, since the projections for holding the magnetic tape cartridges in place relative to each other, when a plurality of magnetic tape cartridges are stacked, are island-like or point-like and are very small in area, the sliding friction acting between the magnetic tape cartridge and the recording and reproducing apparatus can be reduced. Further, unlike the conventional magnetic tape cartridge where the projections are in the form of protrusions, a stack of the magnetic tape cartridges becoming shaky due to warpage of the projections can be avoided.

When the projections are formed near the leading edge and the trailing edge of the cartridge casing with respect to the direction of insertion of the magnetic tape cartridge into the recording and reproducing apparatus, the magnetic tape cartridges are stabilized when they are stacked. In this case, when each of the projections is formed at a predetermined distance from the edge of the cartridge casing, damage on the projections when the magnetic tape cartridge is dropped can be suppressed.

In the case where the projections are provided on the lower surface of the cartridge casing, when the projections are formed outside the circular opening, formed in the lower surface of the cartridge casing at the center thereof, with respect to the direction perpendicular to the direction of insertion of the magnetic tape cartridge into the recording and reproducing apparatus, the drive member of the apparatus can be prevented from interfering with the projections, and at the same time, the magnetic tape cartridges are more stabilized when they are stacked.

The second object of the present invention can be accomplished by a magnetic tape cartridge in accordance with a second aspect of the present invention characterized in that a first boss provided with a locator hole for locating the magnetic tape cartridge relative to a recording and reproducing apparatus when the magnetic tape cartridge is loaded in the recording and reproducing apparatus and a second boss provided with a through hole through which a screw for fastening together the upper and lower halves of the cartridge casing is inserted are erected in contact with each other or close to each other from the inner surface of the cartridge casing near a tape draw-out opening, and the wall thickness of the first boss is smaller than the wall thickness of the second boss.

In this case, it is preferred that the wall thickness of the first boss be in the range of 0.5 to 0.8 times the wall thickness of the second boss.

Further, in the case where a sliding door for opening and closing the tape draw-out opening is provided, it is preferred that the second boss be provided on the outer peripheral surface thereof with a flat surface which is in alignment with the inner edge of a sliding groove formed on the cartridge casing so that the sliding door slides on the groove.

In the case where an arcuate rib coaxially surrounding the reel is erected from the inner surface of the cartridge casing, it is preferred that the first and second bosses be apart from the rib.

In the magnetic tape cartridge in accordance with the second aspect of the present invention, since the first boss provided with the locator hole is smaller in wall thickness than the second boss provided with a through hole through which a screw for fastening together the upper and lower halves of the cartridge casing is inserted, the first boss is cooled faster than the second boss and accordingly the dimensional accuracy and the geometric accuracy of the locator hole can be more easily obtained.

When the second boss is provided on the outer peripheral surface thereof with a flat surface which is in alignment with the inner edge of the door sliding groove formed on the cartridge casing, the second boss can be formed at a sufficient distance from the first boss, and accordingly the dimensional accuracy and the geometric accuracy of the through hole can be more easily obtained and at the same time, lean of the locator hole can be prevented.

Further, in the case where an arcuate rib coaxially surrounding the reel is erected from the inner surface of the cartridge casing, the dimensional accuracy and the geometric accuracy of the through hole can be obtained by forming the first and second bosses apart from the rib.

In the case where a boss provided with a locator hole is erected from the inner surface of the lower half of the cartridge casing near a tape draw-out opening, it is preferred that the lower surface of the upper half of the cartridge casing be provided with a circular recess opposed to the boss. The circular recess can be used for locating the upper half relative to the lower half during assembly of the magnetic tape cartridge.

The third object of the present invention can be accomplished by a magnetic tape cartridge in accordance with a third aspect of the present invention characterized in that a pair of protrusions are provided on each of the lower surface of the top wall of the upper half of the cartridge casing and the upper surface of the bottom wall of the lower half of the cartridge casing to respectively extend along diagonal lines of the cartridge casing.

Each of the protrusions may be uniform in height substantially over its entire length. In this case, it is preferred that the protrusion is about 0.1 mm to 0.5 mm in height. Otherwise, the protrusion may become lower toward the side walls of the cartridge casing at a predetermined rate or stepwise.

By providing such protrusions, the cartridge casing can be rigid enough to prevent expansion or deformation of the cartridge casing by urging force of the spring which urges the brake member and to ensure a sufficient clearance between the reel and the cartridge casing even if the cartridge casing is formed by molding of a plastic material without glass fiber.

Instead of providing such protrusions, the top wall of the upper half of the cartridge casing and the bottom wall of the lower half of the cartridge casing may be formed so as to be thicker toward the center thereof.

The fourth object of the present invention can be accomplished by a magnetic tape cartridge in accordance with a fourth aspect of the present invention characterized in that a thick wall portion is formed in one of the top wall of the upper half of the cartridge casing and the bottom wall of the lower half of the same and a gate for injection molding is provided in a recess formed on the outer surface of the thick wall portion.

It is preferred that the thick wall portion be formed in the top wall of the upper half of the cartridge casing at the center thereof and the gate for injection molding be provided in a recess formed on the outer surface of the thick wall portion.

The gate may be provided in a recess formed on the outer surface of the upper half or the lower half for a purpose other than that for providing a gate.

By providing the gate in a recess, the problems that the gate mark left on the surface of the product obstructs loading and unloading of the magnetic tape cartridge in and from the recording and reproducing apparatus and the gate mark is ground to produce plastic grindings can be avoided. Further, by providing the gate in a recess formed on the outer surface of a thick wall portion, flow of the resin becomes more smooth, and especially when the gate is provided in a recess formed on the outer surface of a thick wall portion formed in the top wall of the upper half of the cartridge casing at the center thereof, the length of the path over which the resin flows during injection molding can be substantially uniform, and the thickness of the cartridge casing near the gate can be prevented from becoming thin even if the gate is formed in a recess.

In the case where a pair of locator holes for locating the magnetic tape cartridge with respect to the recording and reproducing apparatus are provided on the bottom surface of the lower half of the cartridge casing, the gate may be provided in a recess formed on the bottom surface of the lower half in a region surrounded by a straight center line which passes through the center of the bottom surface of the lower half in parallel to the straight line joining the locator holes and a pair of straight lines extending on the bottom surface of the lower half through the respective locator holes in perpendicular to the center line. In this case, especially when the gate is provided at substantially the same distance from the locator holes, the resin can be evenly supplied to both the locator holes from the gate and accordingly the locator holes can be formed at a high accuracy.

Further, in the case where the projections for stacking are provided on the bottom surface of the lower half, the gate may be provided in a region on the trailing side of the projections with respect to the direction of insertion of the magnetic tape cartridge into the recording and reproducing apparatus.

In this case, since the region is not brought into contact with the recording and reproducing apparatus when the magnetic tape cartridge is loaded in and unloaded from the recording and reproducing apparatus, the problems that the gate mark left on the surface of the product obstructs loading and unloading of the magnetic tape cartridge in and from the recording and reproducing apparatus and the gate mark is ground to produce plastic grindings can be avoided without forming a recess.

The fifth object of the present invention can be accomplished by a magnetic tape cartridge in accordance with a fifth aspect of the present invention comprising a cartridge casing formed by fixing together rectangular upper and lower halves, a single reel which is housed for rotation in the cartridge casing and around which a magnetic tape is wound, an arcuate rib which is formed on the cartridge casing to surround the reel and an end of which intersects a side wall of the upper half or the lower half to form a thick wall portion near the intersection of the end of the arcuate rib and the side wall, a cutaway portion, for preventing the magnetic tape cartridge from being inserted into the recording and reproducing apparatus in a wrong direction, formed on the outer surface of the upper half or the lower half at a corner thereof to extend from the upper surface of the upper half or the bottom surface of the lower half halfway of the height of the side wall in such a manner that it cuts the corner in a shape like a triangle including the vicinity of the intersections of the arcuate rib and the side walls and characterized in that a thickness reduction portion which makes the thickness of the side wall substantially uniform is formed on the back side of the side wall near the intersection.

By forming a thickness reduction portion on the part adjacent to the cutaway portion in the direction of height of the side wall, the difference in cooling rate can be substantially nullified near the intersection, whereby formation of a sinkmark and/or lean in the part near the intersection is prevented and formation of a step on the surface at which the upper and lower halves are mated is prevented.

BRIEF DESCRIPTION OF THE DRAWINGS

FIG. 4A is a schematic plan view of the cartridge casing shown in FIGS. 2 and 3, FIG. 4B is a schematic bottom view of the cartridge casing shown in FIGS. 2 and 3, FIG. 5 is an enlarged fragmentary cross-sectional view showing a pair of cartridge casings shown in FIGS. 2 and 3 in a stacked state, FIG. 23 is a view showing the inside structure of still another modification of the upper and lower halves shown in FIG. 18.

PREFERRED EMBODIMENTS OF THE INVENTION

Embodiments of the present invention will be described with reference to the drawings, hereinbelow.

Figure 1:
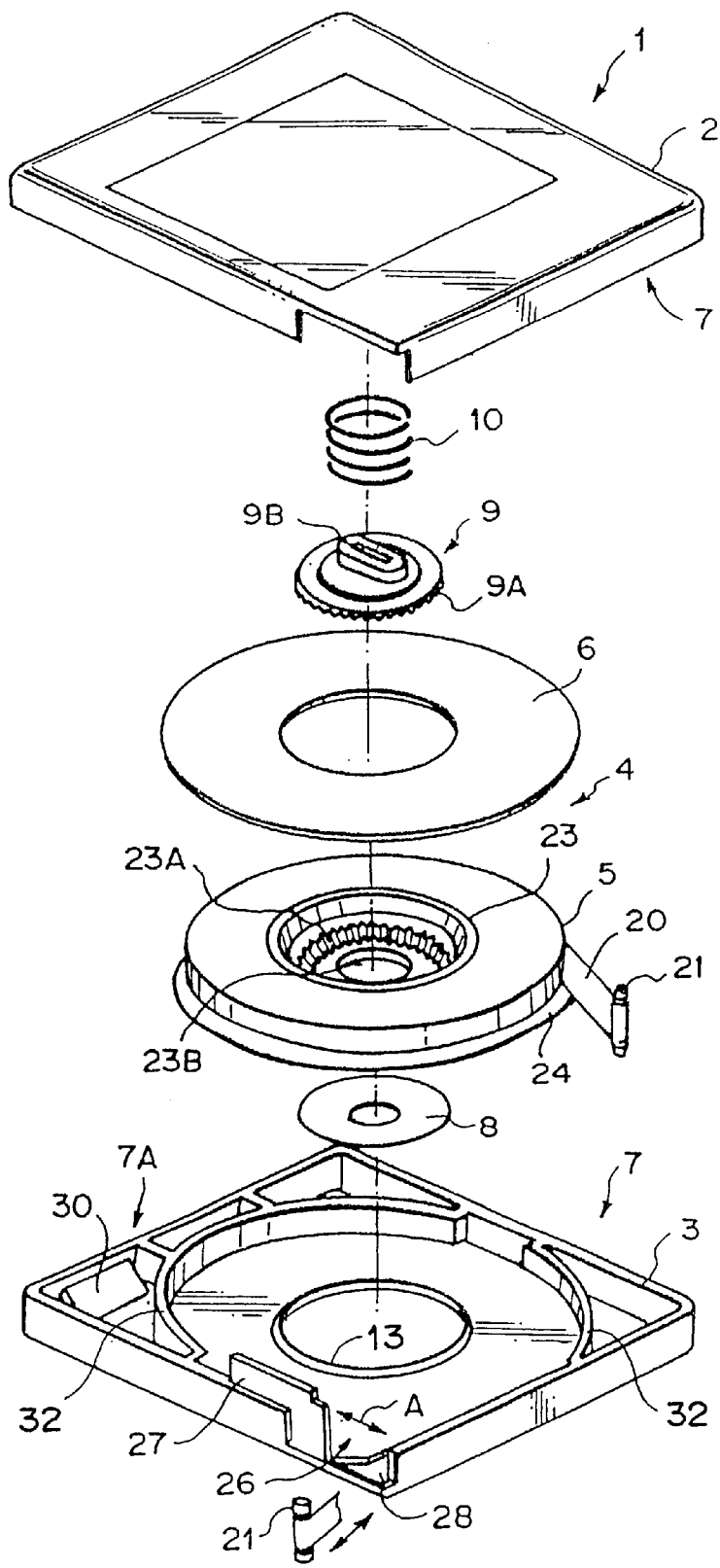
FIG. 1 is an exploded perspective view showing the arrangement of a magnetic tape cartridge in accordance with a first embodiment of the present invention.

FIG. 1 is an exploded perspective view showing the arrangement of a magnetic tape cartridge in accordance with a first embodiment of the present invention. As shown in FIG. 1, a magnetic tape cartridge 1 of this embodiment comprises a hard plastic cartridge casing 7 formed by fixing upper and lower halves 2 and 3, which are similar to each other and rectangular in plan, by fasteners such as screws at their four corners. A single reel 4 around which a magnetic tape 20 is wound is housed for rotation in the cartridge casing 7. A circular opening 13 is formed in the bottom wall of the lower half 3 at the center thereof. An arcuate rib 32 which coaxially surrounds the reel 4 is formed on each of the upper surface of the bottom wall of the lower half 3 and the lower surface of the top wall of the upper half 2 (only the rib 32 on the lower half 3 is shown in FIG. 1).

The reel 4 comprises a lower reel 5 and an upper reel 6 bonded together, for instance, by ultrasonic welding. The lower reel 5 comprises a cylindrical reel hub 23 around which the magnetic tape 20 is wound and a flange 24 which extends radially outward from the lower peripheral end of the reel hub 23 and integrally formed by molding of synthetic resin. A reel plate 8 which is magnetically engaged with a reel drive means for rotating the reel 4 is mounted on the outer surface of the bottom of the reel hub 23. A brake gear 23A is formed on the inner surface of the bottom of the reel hub 23. The brake gear 23A is adapted to be engaged with a break gear 9A formed on a brake button 9 to prevent rotation of the reel 4 when the magnetic tape cartridge 1 is not being used. The reel hub 23 is provided with an opening 23B through which a brake release spindle of a recording and reproducing apparatus pushes upward the brake button 9.

The brake button 9 is provided with the brake gear 9A on the side opposed to the reel hub 23, and an engagement groove 9B into which a brake guide projection on the upper half 2 is inserted is formed on the side of the brake button 9 opposite to the brake gear 9A. The brake button 9 is incorporated in the reel hub 23 urged downward by a coiled spring 10, whereby the brake gear 9A of the brake button 9 and the break gear 23A of the reel hub 23 are normally in mesh with each other to prevent rotation of the reel 4. When the magnetic tape cartridge 1 is loaded in the recording and reproducing apparatus, the brake release spindle of the recording and reproducing apparatus moves upward the brake button 9 overcoming the force of the coiled spring 10 to release the brake gear 9A from the brake gear 23A, thereby permitting rotation of the reel 4.

In one side wall of the cartridge casing 7, a tape draw-out opening 26 through which the magnetic tape 20 is drawn out is formed. The tape draw-out opening 26 is opened and closed by a sliding door 27 which is movable back and forth in parallel to the side wall as shown by double-headed arrow A. The sliding door 27 is spring-urged in the closing position and normally held there.

When the magnetic tape cartridge 1 is not being used, the magnetic tape 20 is fully taken up around the reel 4, where a leader member 21 in the form of a pin (for introducing the magnetic tape 20 into the tape running path in the recording and reproducing apparatus) is held by a holding member in a recess 28 formed near the tape draw-out opening 26.

When the magnetic tape cartridge 1 is loaded in the recording and reproducing apparatus, the brake gear 9A of the brake button 9 is released from the brake gear 23A of the reel hub 23 to permit the reel 4 to rotate, and at the same time, the reel drive means is magnetically engaged with the reel plate 8 to rotate the reel 4. At the same time, the sliding door 27 is opened and the leader member 21 is introduced into a predetermined position on the tape running path, whereby read/write of data from and on the magnetic tape 20 becomes feasible.

A noncontacting memory 30 for recording contents or the like of information recorded on the magnetic tape 20 is mounted in a corner 7A of the cartridge casing 7. The noncontacting memory 30 is a rectangular plate-like member in which read/write of information can be effected without contacting the memory 30, for instance, by electromagnetic induction. The noncontacting memory 30 is supported in the cartridge casing 7 so that the read/write means of the recording and reproducing apparatus can easily effect read/write.

Figure 2:
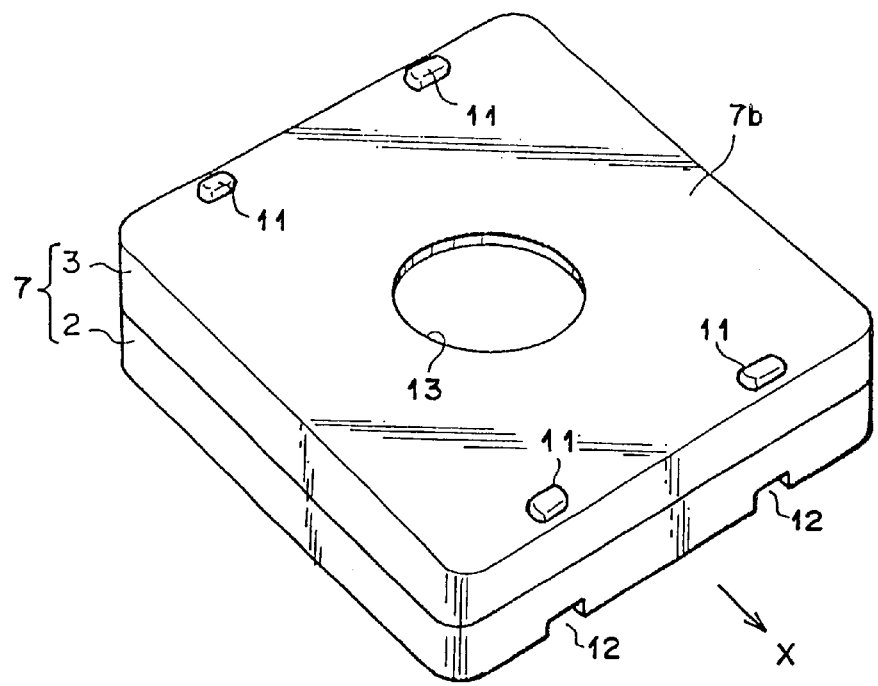
FIG. 2 is a perspective view showing the cartridge casing of the magnetic tape cartridge shown in FIG. 1 with the lower surface directed upward.
Figure 3:
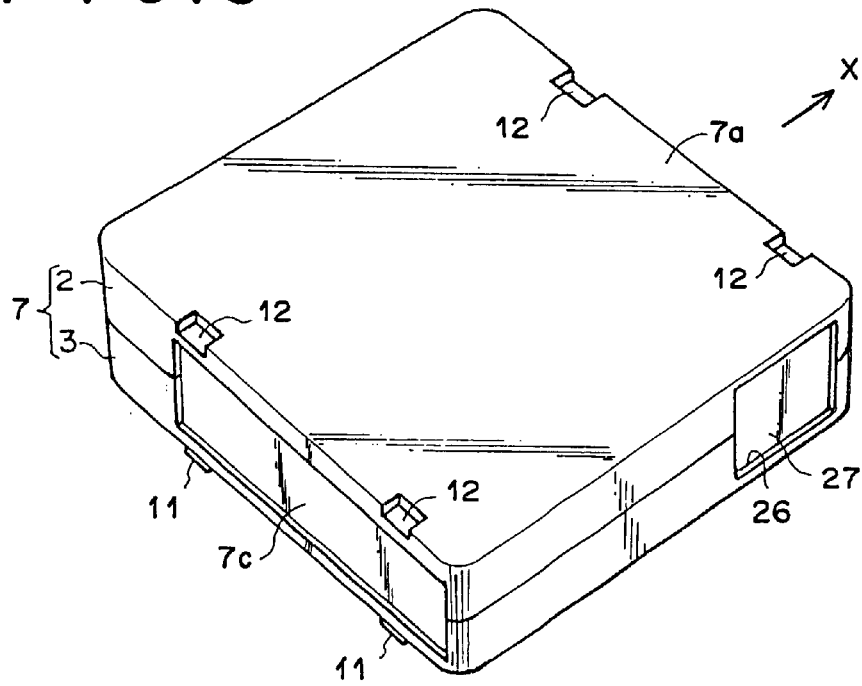
FIG. 3 is a perspective view showing the cartridge casing of the magnetic tape cartridge shown in FIG. 1 with the upper surface directed upward.

FIG. 2 is a perspective view showing the cartridge casing 7 with the lower surface directed upward, FIG. 3 is a perspective view showing the cartridge casing 7 with the upper surface directed upward, FIG. 4A is a schematic plan view of the cartridge casing 7, and FIG. 4B is a schematic bottom view of the cartridge casing 7.

The cartridge casing 7 is provided with flat upper and lower surfaces 7a and 7b. As clearly shown in FIG. 3, the tape draw-out opening 26 through the end of the magnetic tape 20 is drawn out is formed in the side wall of the cartridge casing 7 to extend from the lower half 3 to the upper half 2, and the sliding door 27 closes and opens the opening 26. As described above, the sliding door 27 is urged toward the closing position and held there by a spring (not shown) built in the cartridge casing 7. The leader member 21 in the form of a pin clamping the end of the magnetic tape 21 (FIG. 1) is removably held inside the tape drawn-out opening 27.

The cartridge casing 7 is inserted into the recording and reproducing apparatus in the direction of arrow X in FIGS. 2, 3 and 4B, and is provided on its trailing end face with a labeling region 7c to which a label is applied. The circular opening 13 is formed at the center of the lower half 3.

As shown in FIGS. 2 and 4B, the lower surface 7b of the cartridge casing 7 is provided with four island-like or point-like stacking projections 11. The stacking projections 11 are for preventing the magnetic tape cartridges 1 from being displaced from each other when a plurality of magnetic tape cartridges 1 are stacked and are disposed symmetrically with respect to both the horizontal and vertical lines passing through the center of the circular opening 13. As shown in FIGS. 3 and 4A, the upper surface 7a of the cartridge casing 7 is provided with four recesses 12 which adapted to be engaged with the stacking projections 11 of the upper magnetic tape cartridge 1 when a plurality of magnetic tape cartridges are stacked. Each of the recesses 12 also open to the side surfaces of the cartridge casing 7. Though the illustrated projection 11 are substantially rectangular in plan, they may be square or circular in plan.

In order to prevent the stacking projections 11 from interfering with the reel drive means of the recording and reproducing apparatus when the reel drive means accesses the magnetic tape cartridge 1, it is preferred that the projections 11 be positioned so that the lines L1 and L2 (FIG. 4B) which pass the inner edges of the projections 11 in parallel to the direction of insertion of the magnetic tape cartridge 1 lie outside the circular opening 13.

As shown in FIG. 5, showing a pair of cartridge casings 7 in a stacked state, it is preferred that the height t of the projections 11 on the lower surface 7b of the cartridge casing 7 be slightly larger than the depth of the recesses 12 on the upper surface 7a of the cartridge casing 7 so that a slight gap G is formed between the lower surface 7b of the upper cartridge casing 7 and the upper surface 7a of the lower cartridge casing 7 when a plurality of magnetic tape cartridges 1 are stacked. With this arrangement, the lower surface 7b of the upper cartridge casing 7 and the upper surface 7a of the lower cartridge casing 7 do not scrape against each other when a plurality of magnetic tape cartridges 7 are transported in a stacked state, whereby generation of powder of the material due to wear, which can cause drop-out can be prevented and at the same time, the upper surfaces 7a or the lower surfaces 7b of the cartridge casings 7 can be prevented from being scratched.

Figure 6A:
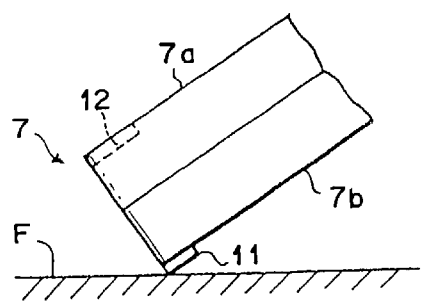
FIGS. 6A and 6B are views for illustrating how the projection for stacking impacts against the floor when the magnetic tape cartridge drops to the floor.

Further, it is preferred that the projections 11 be formed near the leading edge or the trailing edge of the cartridge casing 7 (the upper and lower edges as seen in FIG. 4B) from the viewpoint of stability of stacked magnetic tape cartridges 1. However, in the case where the projections 11 are formed in contact with the edges, the projections 11 impact against the floor F as shown in FIG. 6A and can be collapsed when the magnetic tape cartridge 1 obliquely drops to the floor F, whereby the projections 11 is disabled from engaging with the recesses 12. Further, when the mold for molding the cartridge casing 7 is formed so that the projections 11 are formed in contact with the edges, marks of processing machines (e.g., cutting marks or spark erosion marks) are left on the side surface of the projections 11, which makes it difficult to make the mold.

Figure 6B:
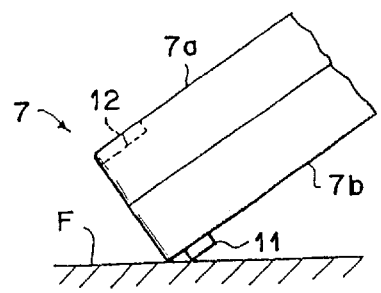

In order to avoid this problem, in this particular embodiment, the projections 11 are formed at a predetermined distance d from the edges of the cartridge casing 7 as shown in FIG. 5. It is preferred that the distance d be larger than the height t of the projections 11 so that fear of collapse of the projections 11 is reduced when the magnetic tape cartridge 1 drops to the floor F as shown in FIG. 6B.

Figure 7A:
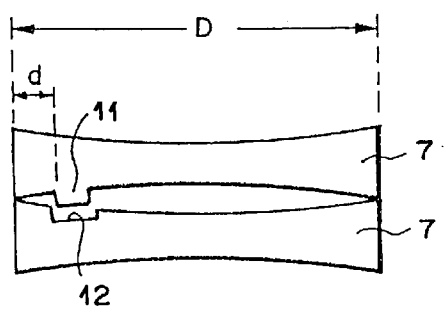
FIGS. 7A and 7B are views for illustrating the base of determining the distance between the projection for stacking and the edge of the cartridge casing.
Figure 7B:
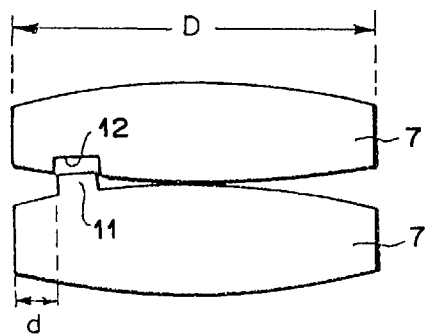

FIGS. 7A and 7B are views for illustrating the base of determining the distance d between the projections 11 and the leading and trailing edges of the cartridge casing 7 taking into account warpage of the cartridge casing 7 (exaggerated in FIGS. 7A and 7B). That is, assuming that (1) the warpage of the cartridge casing 7 is in a quadric curve, (2) an acceptable warpage of the cartridge casing 7 is 0.2 mm for each side, and (3) the height of the effective portion of the projections is 0.2 mm, and the length of the cartridge casing 7 in the direction of insertion is D, it is preferred that formula $t<d \leq 0.15D$ be satisfied.

Figure 8A:
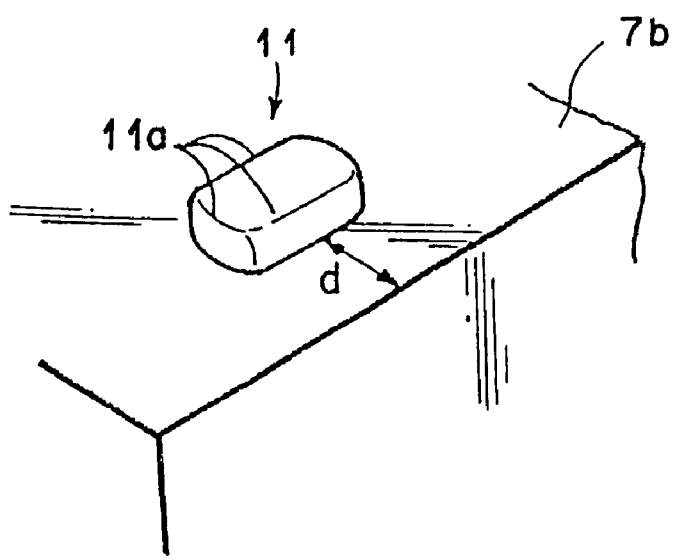
FIGS. 8A and 8B are perspective views for illustrating preferred shape of the projection for stacking.
Figure 8B:
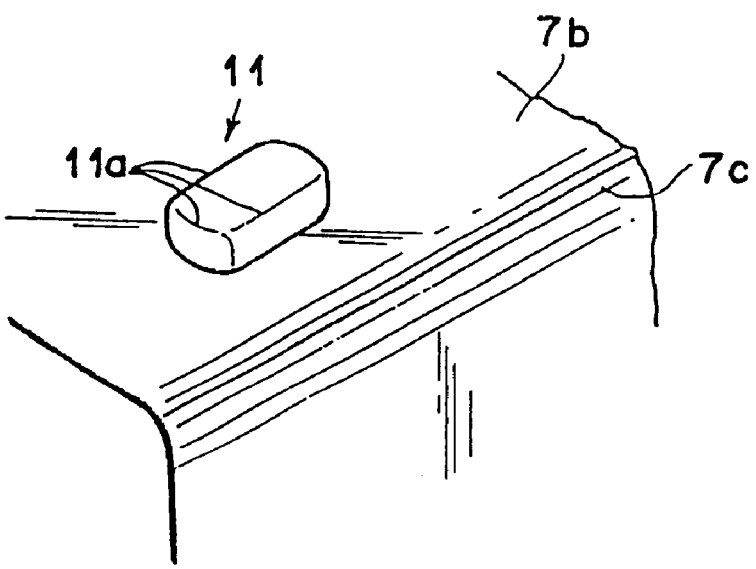

In order to facilitate engagement of the projections 11 with the recesses 12, it is preferred that the edges of the projections 11 be rounded as shown in FIG. 8A or the side surfaces of the projection 11 be inclined. Further when the edge of the cartridge casing 7 near to the projection 11 is rounded, it is preferred that the projection 11 be apart from the rounded portion.

As can be understood from the description above, in this embodiment, since island-like or point-like projections 11 are formed on the lower surface 7b of the cartridge casing 7 so that when a plurality of magnetic tape cartridges 1 are stacked, the projections 11 on each magnetic tape cartridge 1 are engaged with recesses 12 formed on the upper surface 7a of the lower magnetic tape cartridge 1 and the stack of the magnetic tape cartridges is stabilized, the sliding resistance when the magnetic tape cartridge 1 is inserted into a recording and reproducing apparatus can be reduced. Further, unlike the conventional magnetic tape cartridges where the projections are in the form of protrusions, a stack of the magnetic tape cartridges becoming shaky due to warpage of the projections can be avoided.

Since the projections 11 are positioned near the leading edge and the trailing edge of the cartridge casing 7 in the direction of insertion of the magnetic tape cartridge 1 and positioned in the direction perpendicular to the direction of insertion of the magnetic tape cartridge 1 so that the lines L1 and L2 (FIG. 4B) which pass the inner edges of the projections 11 in parallel to the direction of insertion of the magnetic tape cartridge 1 lie outside the circular opening 13, the stack of the magnetic tape cartridges 1 is stabilized and at the same time, the stacking projections 11 are prevented from interfering with the reel drive means of the recording and reproducing apparatus when the reel drive means accesses the magnetic tape cartridge 1.

Further, when formula t<d≦0.15D, wherein d represents the distance between the projections 11 and the leading and trailing edges of the cartridge casing 7, t represents the height of the projections 11 and D represents the length of the cartridge casing 7 in the direction of insertion, is satisfied, the stack of the magnetic tape cartridges 1 is stabilized and at the same time, damage on the projections 11 can be prevented when the magnetic tape cartridge 1 drops.

Though, in the embodiment described above, the projections 11 are provided on the lower surface 7b of the cartridge casing 7 and the recesses 12 are provided on the upper surface 7a of the cartridge casing 7, the projections 11 may be provided on the upper surface 7a of the cartridge casing 7 and the recesses 12 are provided on the lower surface 7b of the cartridge casing 7. Also in this case, the distanced may be set in the similar manner taking into account the warpage of the cartridge casing 7 such as shown in FIG. 7B.

In order to keep stability of the stack of the magnetic tape cartridges, the projections 11 may be three in number. Accordingly, only one projection 11 may be formed near the trailing edge of the cartridge casing 7. Further, though, in the embodiment described above, the tape draw-out opening 26 is closed and opened by the sliding door 27, the opening 26 may be provided with a different type of door.

The tape draw-out opening 26 must be provided with a space for accommodating the tape leader member 21, a space through which the magnetic tape 20 runs and a space through which a tape draw-out member on the recording and reproducing apparatus is given access to the tape leader member 21, which greatly limits the space near the tape draw-out opening 26 in which bosses can be provided.

Further, since the circular rib 32 (FIG. 1) which coaxially surrounds the reel 4 is erected from the upper surface of the bottom wall of the lower half 3, the space near the tape draw-out opening 26 in which bosses can be provided is further limited and accordingly, the bosses for the locator holes for locating the magnetic tape cartridge 1 with respect to the recording and reproducing apparatus and for the screw holes for fixing the upper and lower halves and/or the circular rib must be provided in contact with each other or close to each other.

However, when the bosses and the rib are formed in contact with each other or close to each other, the part is locally thickened, which makes it difficult to keep a sufficient dimensional accuracy and geometric accuracy of the locator holes when the cartridge casing is molded due to nonuniform cooling in the mold and difference in shrinkage factor due to the thickness difference. Further, the bosses, the holes and the rib become apt to lean.

Further, when there exists a part at which the wall thickness is extremely large as compared with other parts, there arises fear that sink marks and/or welding lines are generated on the inner surface of the locator hole and the locator hole is disabled from functioning as a locator.

Further, even in the case where the bosses and the rib are in contact with each other but are simply close to each other, the part of the wall of the mold between parts which are close to each other is less apt to be cooled as compared with other parts, and accordingly, it is difficult to keep a sufficient dimensional accuracy and geometric accuracy and the bosses, the holes and the rib become apt to lean.

FIGS. 9 to 16 show structures which can ensure the dimensional accuracy and the geometric accuracy even if a boss provided with a locator hole is formed near the tape draw-out opening close to a boss provided with a screw hole for a screw for fixing the upper and lower halves.

Figure 9A:
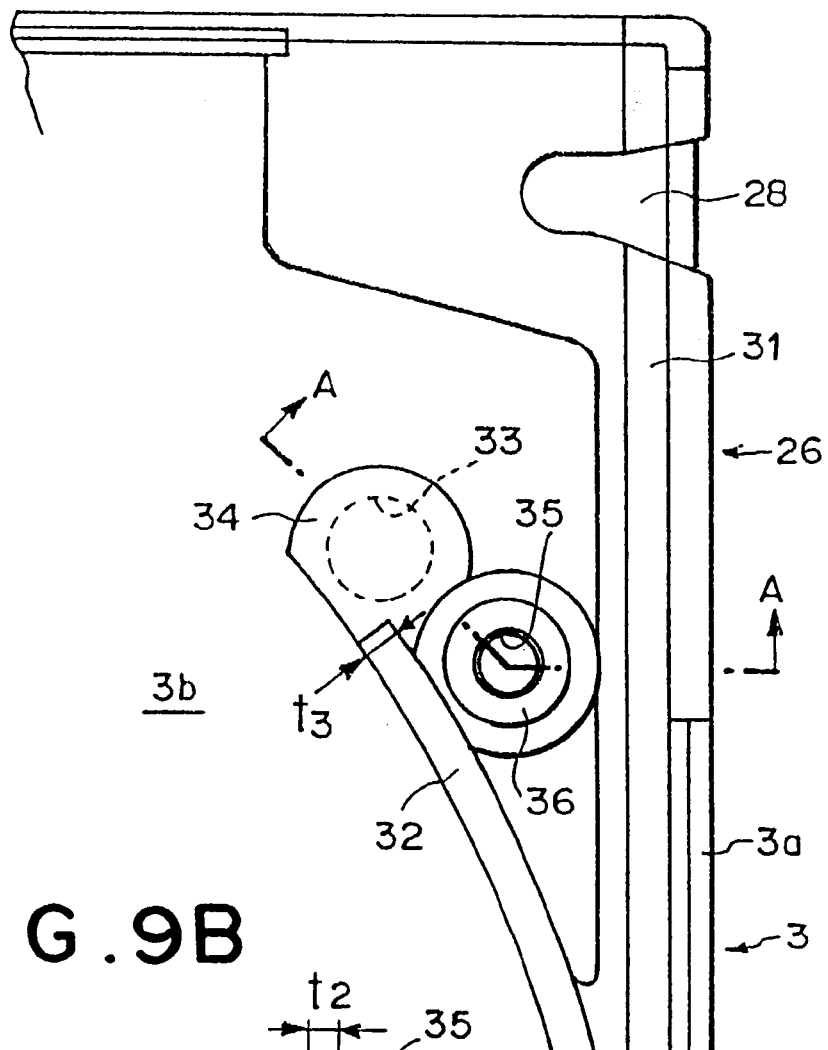
FIG. 9A is an enlarged fragmentary plan view showing the inside structure of the lower half of the cartridge casing.
Figure 9B:
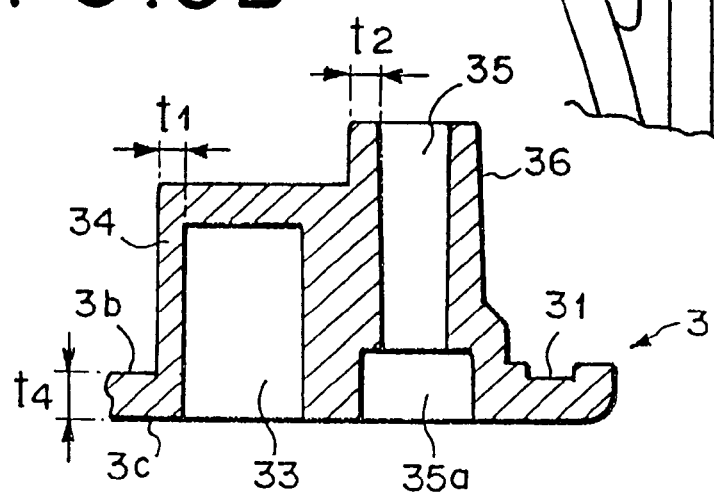
FIG. 9B is a cross-sectional view taken along line A—A in FIG. 9A, FIGS. 10 and 11 are enlarged fragmentary plan views of modifications of the lower half of the cartridge casing shown in FIGS. 9A and 9B.

FIG. 9A is an enlarged fragmentary plan view showing the inside structure of the lower half of the cartridge casing, and FIG. 9B is a cross-sectional view taken along line A—A in FIG. 9A.

An end portion of a side wall 3a of the lower half 3 is cut to form the tape draw-out opening 26, and a recess 28 which removably holds the lower end portion of the leader member 21 (FIG. 1) is formed on the upper surface 3b of the bottom wall of the lower half 3 to open to the tape draw-out opening 26 (a similar recess is formed also on the lower surface of the top wall of the upper half 2). Further, a sliding groove 31 on which the sliding door 27 slides is formed inside the side wall 3a to extend along the inner surface of the side wall 3a across the recess 28. From the upper surface 3b of the bottom wall of the lower half, is erected a circular rib 32 to coaxially surround the reel 4.

A boss 34 (a first boss) provided with a locator hole (a blind hole) 33 which is coaxial with the boss 34 and opens on the lower surface 3c of the bottom wall of the lower half 3 is erected from the upper surface 3b of the bottom wall of the lower half 3 integrated with an end of the rib 32. Further, a boss 36 (a second boss) which is provided with a screw hole (a through hole) 35 coaxially therewith is erected on the side of the boss 34 nearer to the tape draw-out hole 26 integrated with both the boss 34 and the rib 32. The lower end portion 35a of the screw hole 35 at which the screw hole 35 opens on the lower surface 3c of the bottom wall of the lower half 3 is of a larger diameter to accommodate the head of a screw for fixing the upper and lower halves 2 and 3. A self-tapping screw is inserted into the screw hole 35 from the lower surface 3c so that the leading end portion of the screw is inserted in a self-tapping fashion into a hole formed in a boss (not shown) erected from the lower surface of the top wall of the upper half 2 and fastening together the upper and lower halves 2 and 3.

The wall thickness t1 of the boss 34 provided with the locator hole 33 is smaller than the wall thickness t2 of the boss 36, the wall thickness t3 of the rib 32 or the sum of the wall thicknesses t2 and t3. It is preferred that the wall thickness t1 be smaller than the wall thickness t4 of the bottom wall of the lower half 3. It is further preferred that the wall thickness t1 of the boss 34 be 0.5 to 0.8 times the wall thickness t2, t3 and t4. Further, it is preferred that the wall thickness of the boss 34 be smaller than the thickness of the other parts at least over its entire circumference.

When the wall thickness t1 of the boss 34 provided with the locator hole 33 is smaller than the wall thickness of the other parts, the boss 34 is cooled and solidified faster than the other parts and accordingly the dimensional accuracy and the geometric accuracy of the locator hole 33 can be more easily obtained.

Figure 10:
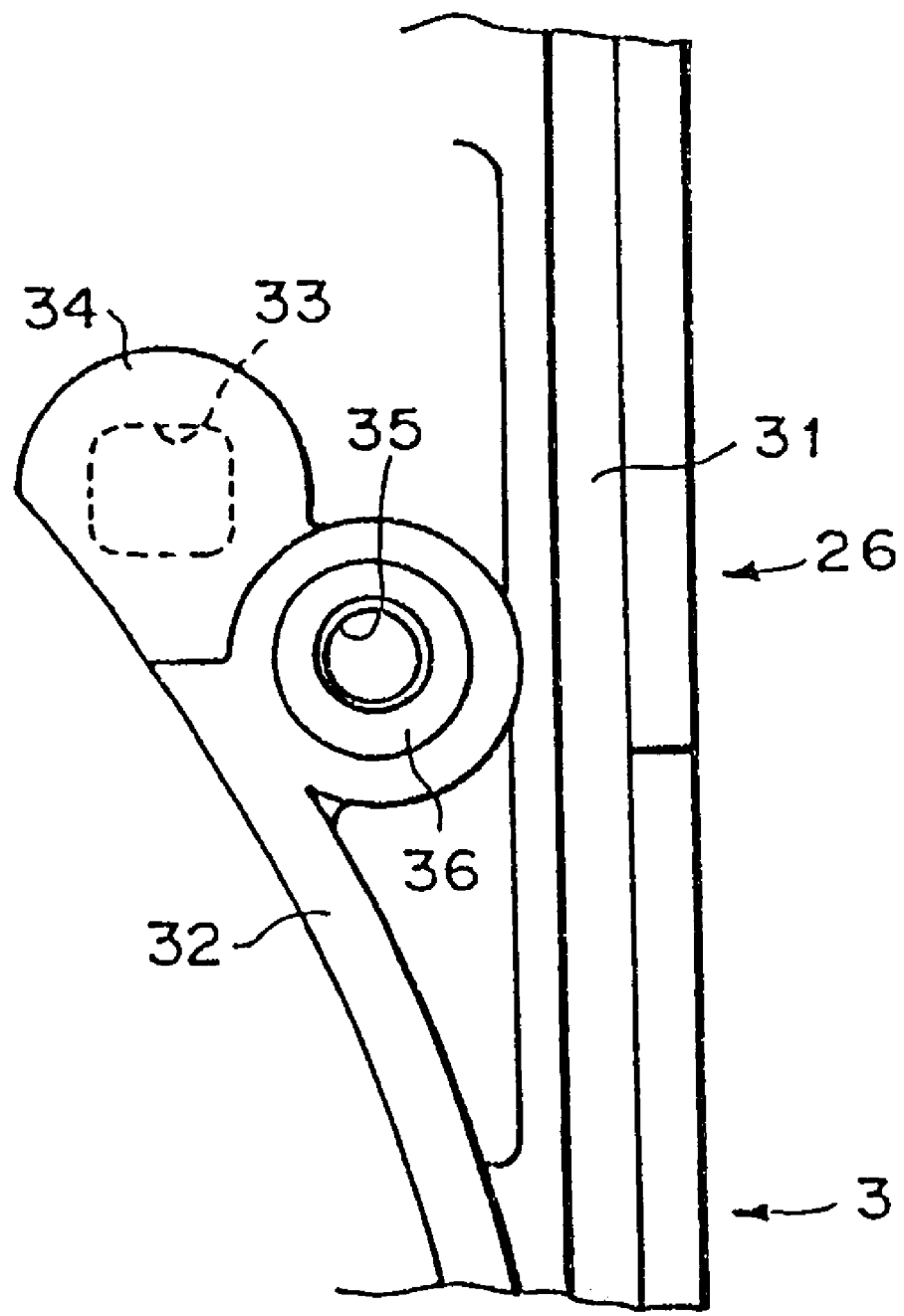

The structure shown in FIG. 10 is a modification of the structure shown in FIG. 9A and in the structure shown in FIG. 10, the locator hole 33 in the boss 34 is substantially square whereas the locator hole 33 in the boss 34 is circular in the structure shown in FIG. 9A. The locator hole 33 may be of a hexagon or other polygon in shape. Also, the boss 34 itself may be substantially square.

Figure 11:
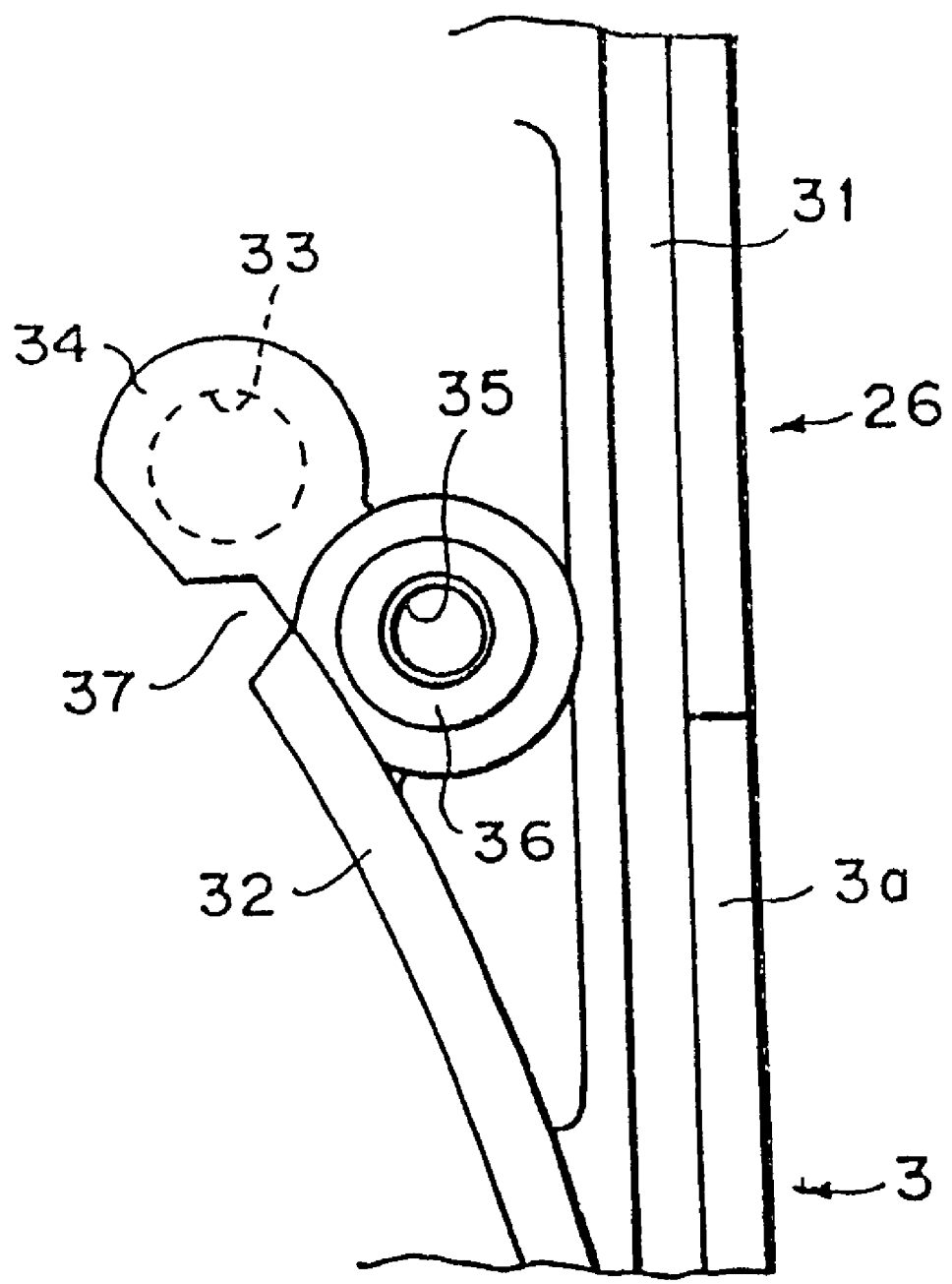

In the structure shown in FIG. 11, the bosses 34 and 36 and the rib 32 are joined together and a recess 37 is formed on the inner surface of the rib 32 at the joint. Also with this arrangement, the effect similar to that obtained by the aforesaid structures can be obtained.

Figure 12A:
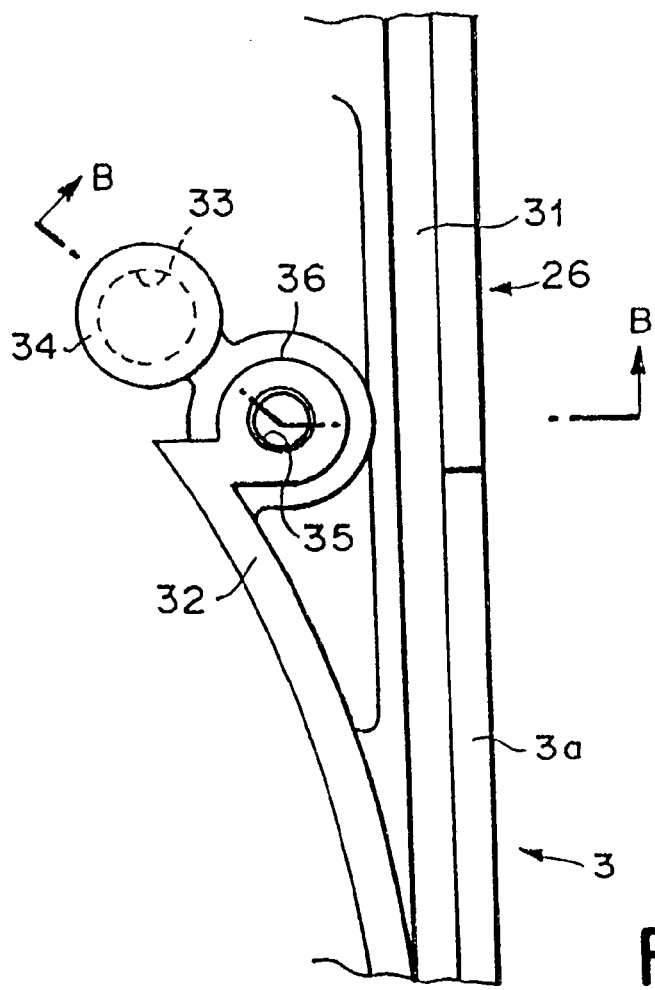
FIG. 12A is an enlarged fragmentary plan view showing the inside structure of a lower half different from that shown in FIGS. 9A and 9B.
Figure 12B:
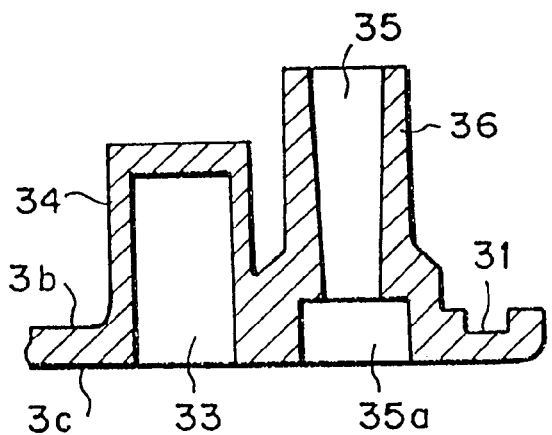
FIG. 12B is a cross-sectional view taken along line B—B in FIG. 12A.

FIGS. 12A and 12B show still another structure of this part. FIG. 12A is an enlarged fragmentary plan view showing the inside structure of a lower half different from those described above, and FIG. 12B is a cross-sectional view taken along line B—B in FIG. 12A.

Figure 13:
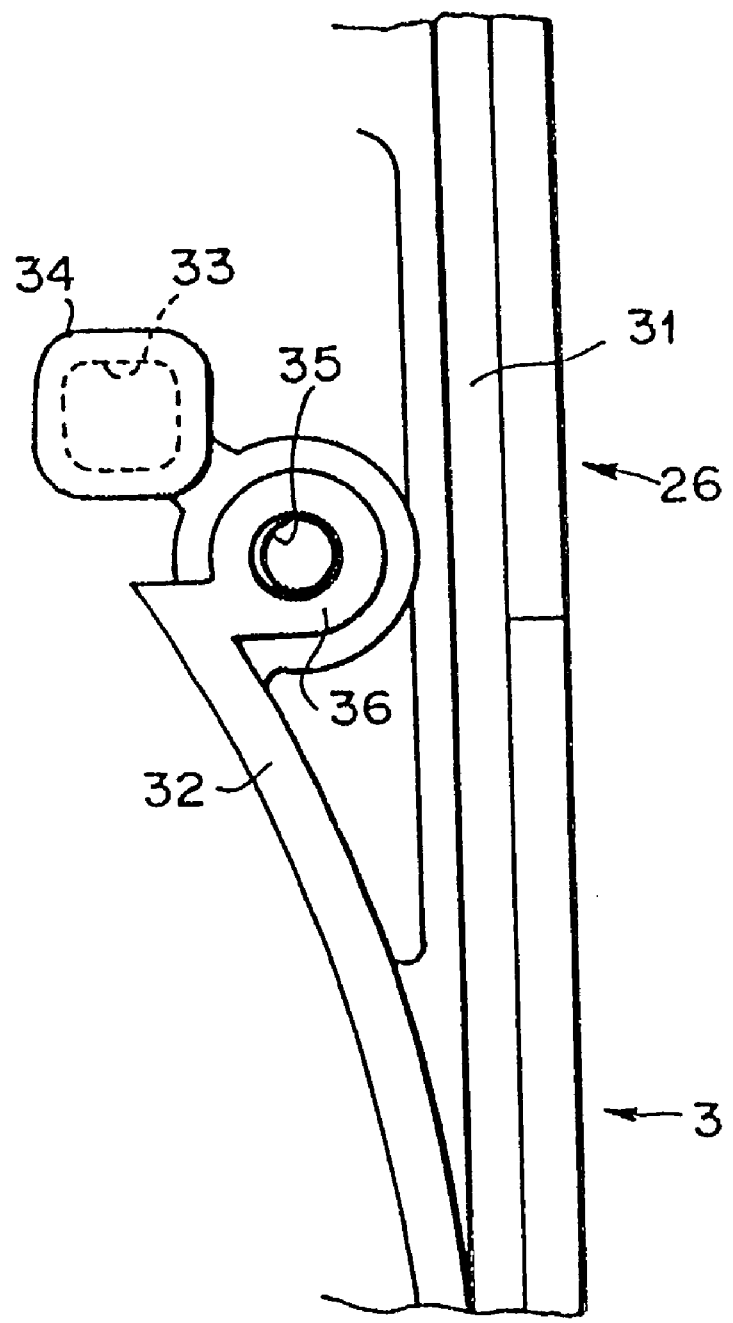
FIG. 13 is an enlarged fragmentary plan view of a modification of the lower half of the cartridge casing shown in FIG. 12A.

In this structure, the end portion of the rib 32 is shortened and is apart from the boss 34 provided with the locator hole 33. Also with this arrangement, the effect similar to that obtained by the structure shown in FIG. 11 where the recess 37 is formed can be obtained. The structure shown in FIG. 13 is a modification of the structure shown in FIG. 12A and in the structure shown in FIG. 13, the locator hole 33 in the boss 34 is substantially square whereas the locator hole 33 in the boss 34 is circular in the structure shown in FIG. 12A.

In the structures shown in FIGS. 9 to 13, the boss 36 provided with the screw hole 35 is formed close to the boss 34 provided with the locator hole 33 and the bosses 34 and 36 are joined together. In this case, though the door for closing the tape draw-out opening 26 need not be limited to the sliding door 27, the door is normally in the form of the sliding door. Still other structures are shown in FIGS. 14 to 16.

Figure 14A:
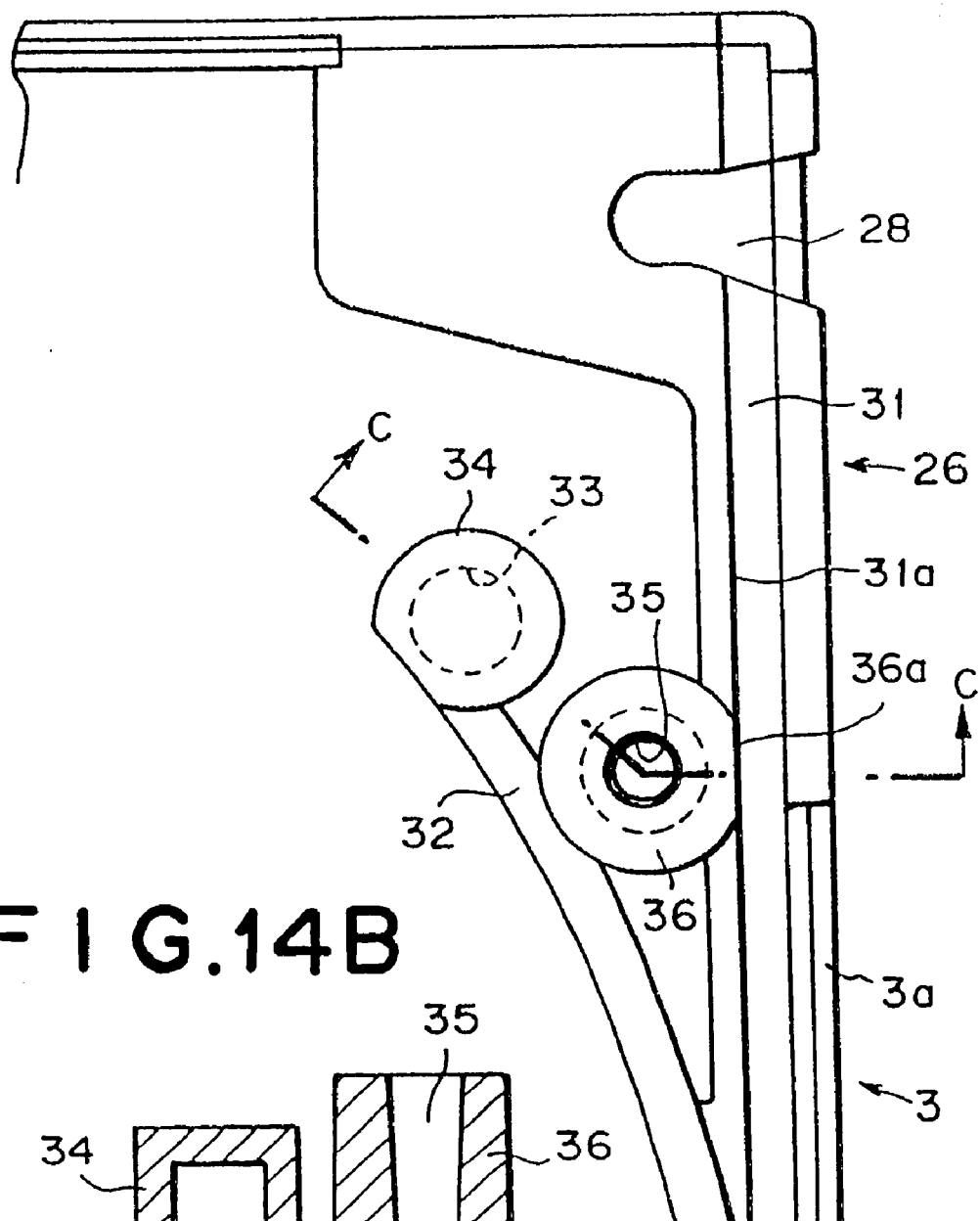
FIG. 14A is an enlarged fragmentary plan view showing the inside structure of a lower half different from those shown in FIGS. 9A and 9B and 12A and 12B.
Figure 14B:
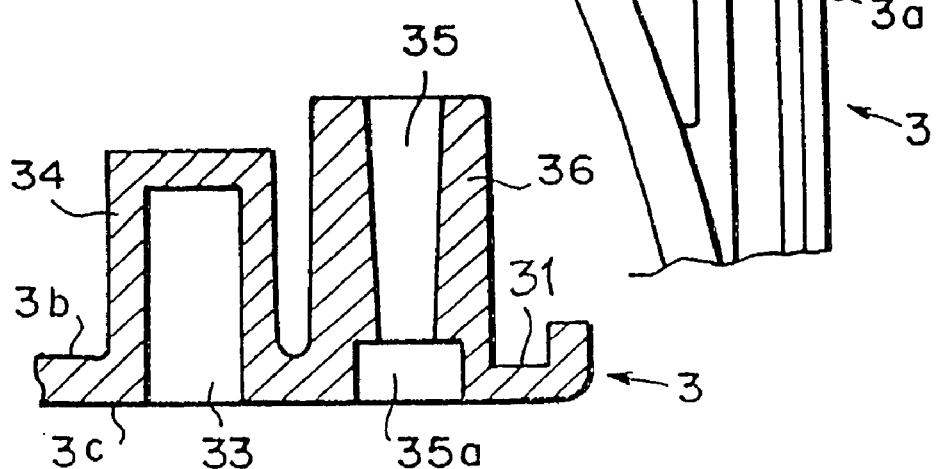
FIG. 14B is a cross-sectional view taken along line C—C in FIG. 14A, FIGS. 15 and 16 are enlarged fragmentary plan views showing the inside structure of lower halves different from those shown in FIGS. 9A and 9B, 12A and 12B, and 14A and 14B.

In the structure shown in FIGS. 14A and 14B, which are an enlarged fragmentary plan of the lower half and a cross-sectional view taken along line C—C in FIG. 14A, the boss 34 provided with the locator hole 33 and the boss 36 provided with the screw hole 35 are joined with the rib 32 apart from each other. Accordingly, the boss 36 is displaced toward the sliding groove 31 for the sliding door 27 and is formed with a flat surface 36a in alignment with the inner edge 31a of the sliding groove 31. In other words, the outer peripheral surface of the boss 36 is cut in a D-shape. Further, the wall thickness of the boss 34 is smaller than that of the boss 36.

With this arrangement, the boss 36 can be erected at a sufficient distance from the boss 34, and accordingly, a sufficient dimensional accuracy and a sufficient geometric accuracy of the locator hole 33 can be ensured and at the same time, lean of the locator hole 33 can be prevented.

Figure 15:
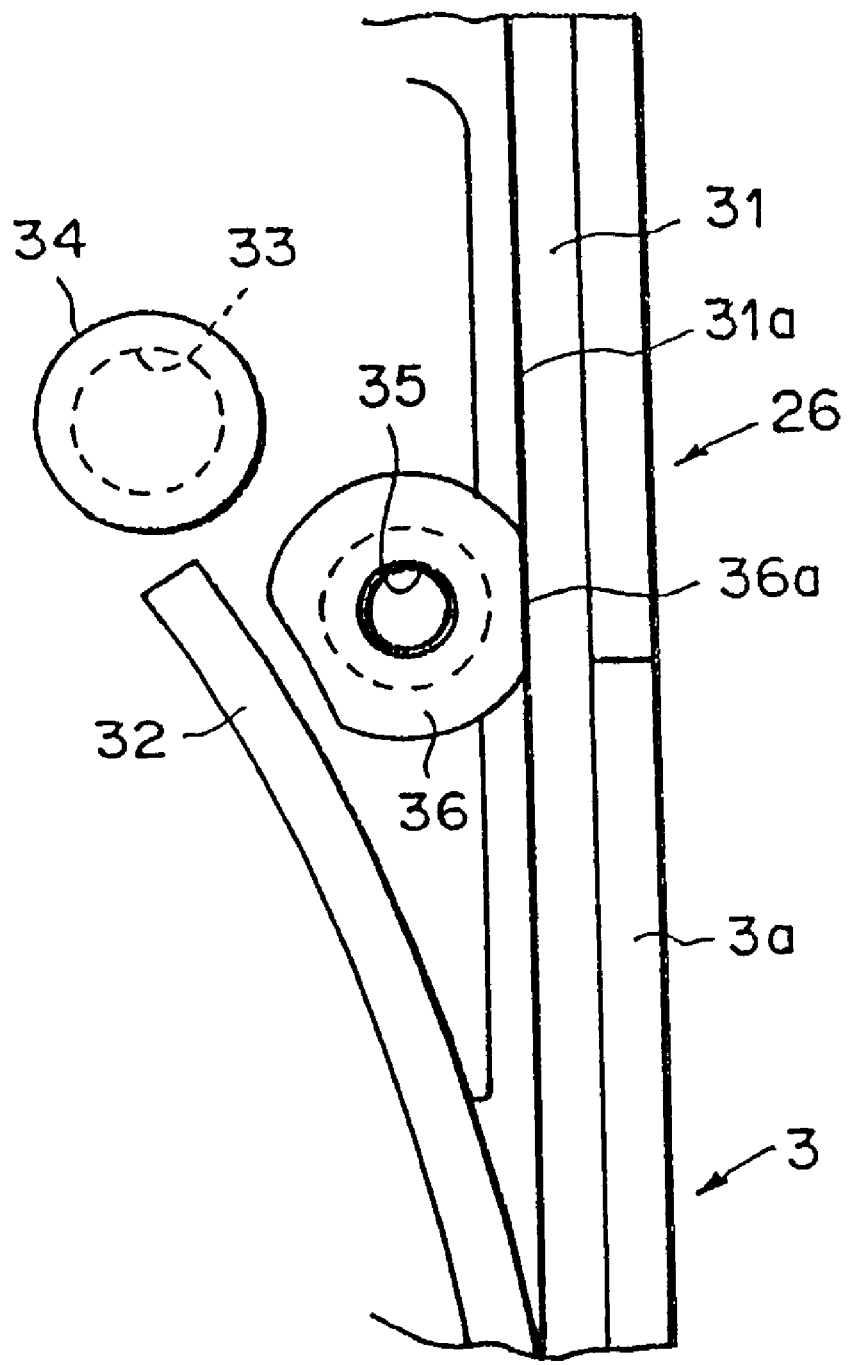
Figure 16:
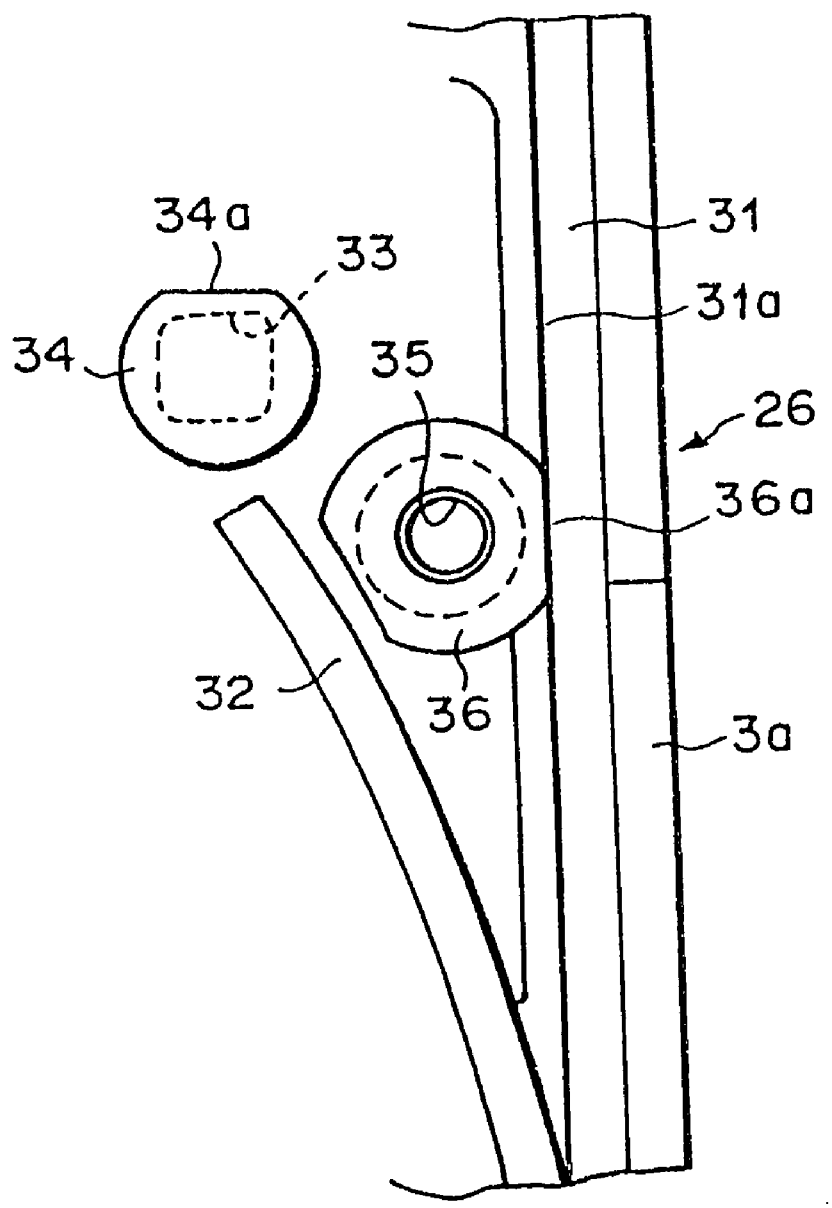

In the structure shown in FIG. 15, the boss 36 is formed with a flat surface 36a in alignment with the inner edge 31a of the sliding groove 31 as in the structure shown in FIG. 14A. However, in the structure shown in FIG. 15, both the bosses 34 and 36 are formed apart from the rib 32. Further, in the structure shown in FIG. 16, in addition to the feature shown in FIG. 15, the locator hole 33 is substantially square and the outer peripheral surface of the boss 34 is cut in a D-shape.

The locator holes 33 may be used not only to locate the magnetic tape cartridge 1 when the magnetic tape cartridge 1 is loaded in a recording and reproducing apparatus but also to locate the lower half 3 in the automatic assembly of the magnetic tape cartridge 1.

Figure 17:
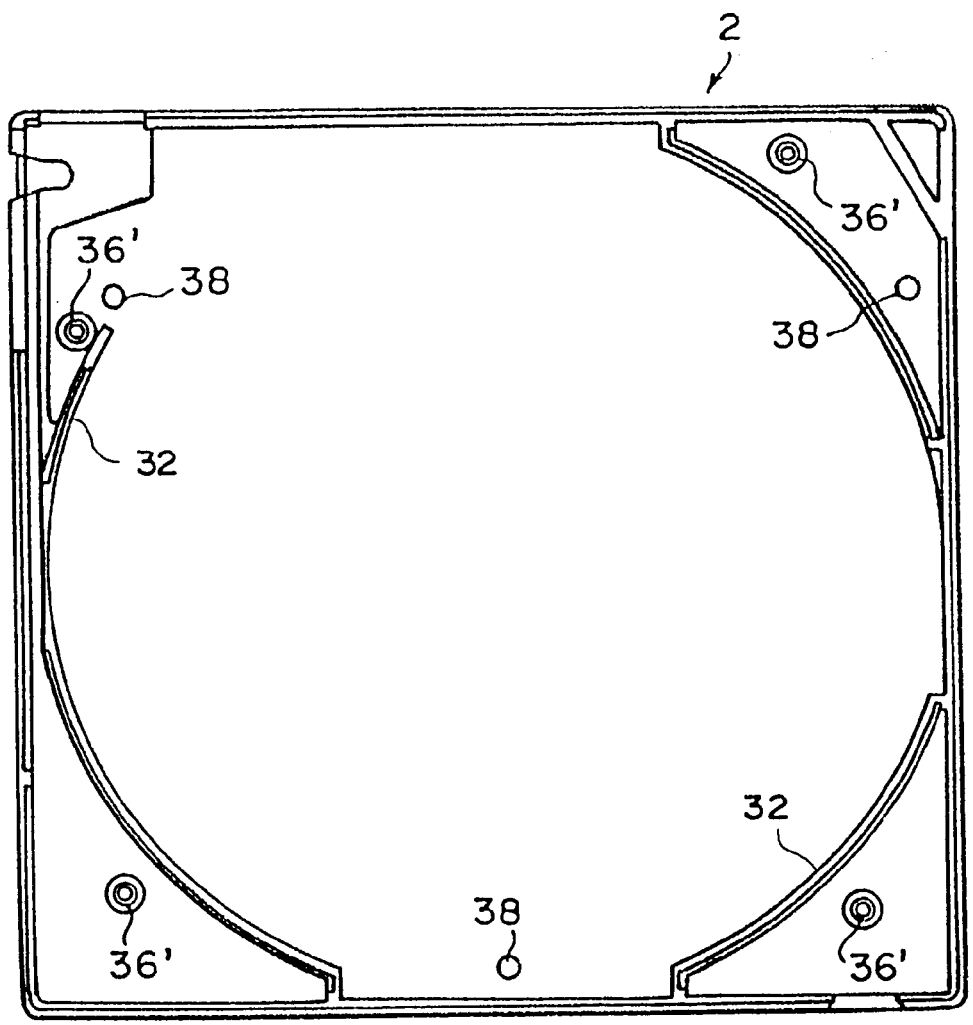
FIG. 17 is a bottom view of the upper half.

FIG. 17 is a bottom view showing the upper half 2 to be mated with the lower half 3 partly abbreviated. As shown in FIG. 17, on the back side of the upper half 2, arcuate ribs 32 which coaxially surround the reel 4 are provided, bosses 36', into which the screws for fastening the upper and lower halves 2 and 3 are inserted in a self-tapping fashion, are provided to be opposed to the bosses 36 on the lower half 3, and a pair of circular recesses 38 are provided to be opposed to the bosses 34 provided with the locator holes 33 on the lower half 3. The recesses 38 may be used to locate the upper half 2 in the automatic assembly of the magnetic tape cartridge 1.

The cartridge casings 7 with the structure described above are generally formed by injection molding. There has been a problem that the top wall and the bottom wall of the cartridge casing 7 are sometimes deformed (expanded) outward by the force of the coiled spring 10 (FIG. 1) in the cartridge casing 7. Such deformation of the top wall and the bottom wall sometimes gives rise to a problem that the cartridge casing 7 interferes with the reel 4 to obstruct rotation of the reel 4 when the magnetic tape cartridge 1 is loaded in a recording and reproducing apparatus, the magnetic tape cartridge 1 cannot be located or the magnetic tape cartridges 1 cannot be properly stacked.

In order to overcome such a problem, conventionally the cartridge casing 7 has been formed by molding of a hard resin such as a glass-fiber reinforced polycarbonate resin so that the rigidity of the cartridge casing is increased and deformation of the cartridge casing 7 is prevented.

However this approach has been disadvantageous in that the service life of the molds is shortened and wear of the bucket of the recording and reproducing apparatus is increased when the magnetic tape cartridge 1 is loaded in or unloaded from the recording and reproducing apparatus. That is, use of glass fiber reinforcement is not preferred from these viewpoints.

In the cartridge casings shown in FIGS. 18 to 23, a pair of protrusions 40 are provided on each of the lower surface 2b of the top wall 2A of the upper half 2 of the cartridge casing 7 and the upper surface 3b of the bottom wall 3A of the lower half 3 of the cartridge casing 7 to respectively extend along diagonal lines of the cartridge casing 7, whereby the cartridge casing 7 can be rigid enough to prevent expansion or deformation of the cartridge casing 7 by urging force of the coiled spring 10 and to ensure a sufficient clearance between the reel 4 and the cartridge casing 7 even if the cartridge casing 7 is formed by molding of a hard resin without glass fiber.

Figure 18:
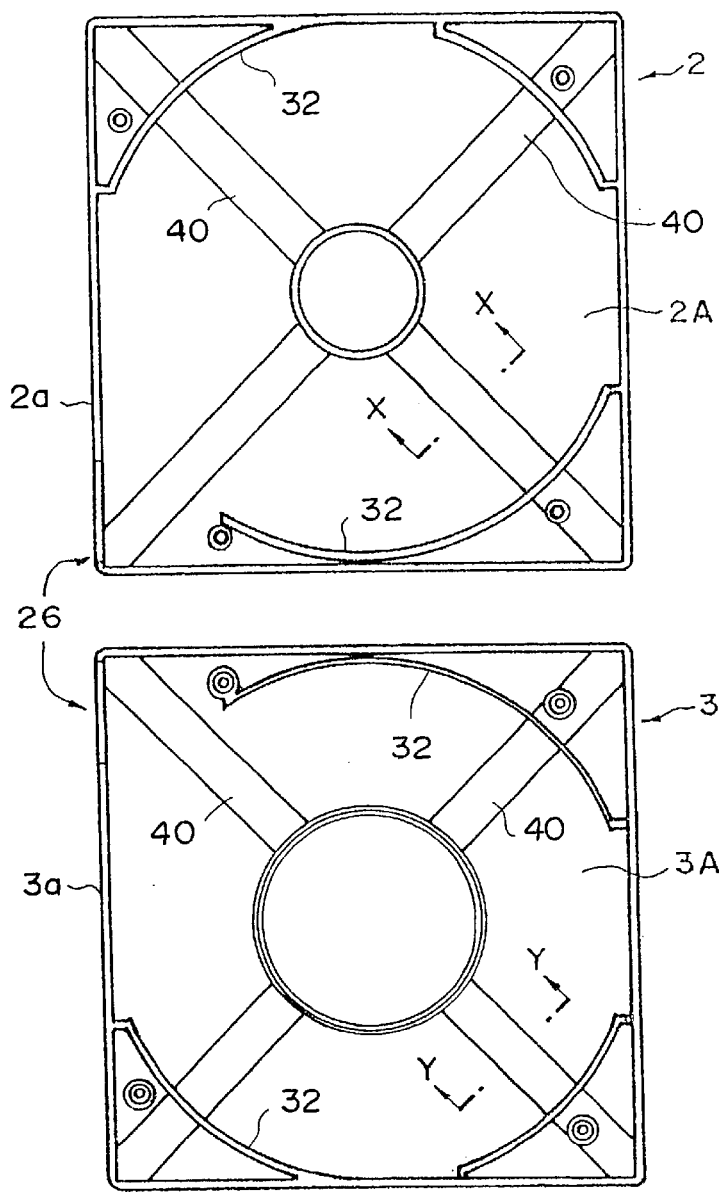
FIG. 18 is a view showing the inside structure of the upper and lower halves provided with protrusions diagonally extending on the inner surface of the upper and lower halves.
Figure 19:
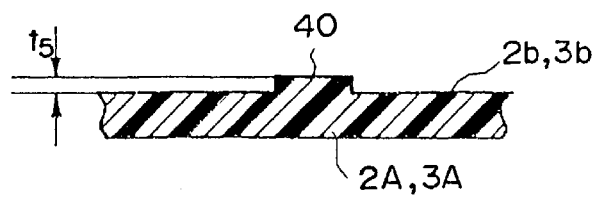
FIG. 19 is a cross-sectional view taken along line X—X or Y—Y in FIG. 18.
Figure 20:
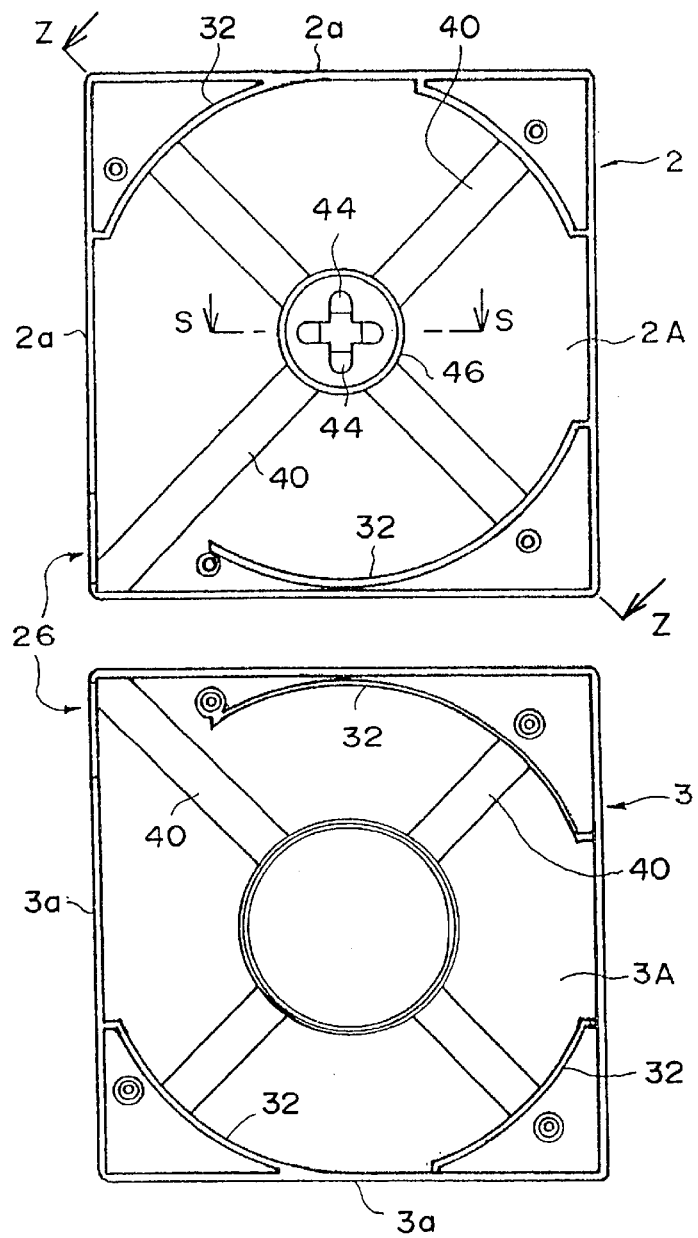
FIG. 20 is a view showing the inside structure of a modification of the upper and lower halves shown in FIG. 18.
Figure 21:
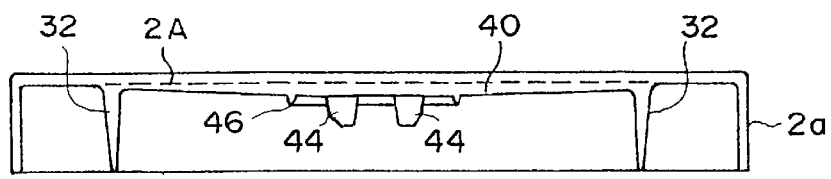
FIG. 21 is a cross-sectional view taken along line Z—Z in FIG. 20.
Figure 22:
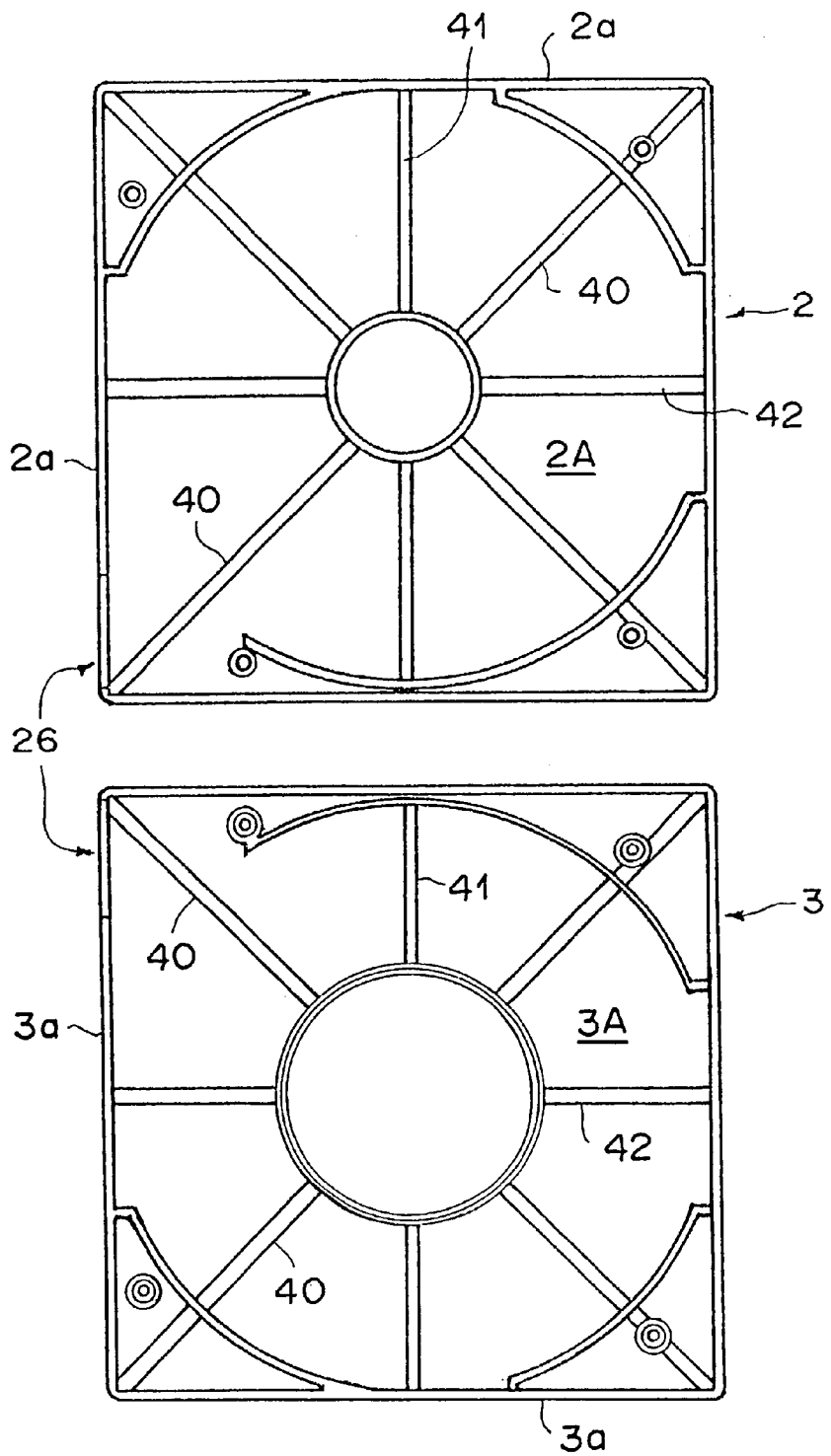
FIG. 22 is a view showing the inside structure of another modification of the upper and lower halves shown in FIG. 18.

FIG. 18 is a view showing the inside structure of the upper and lower halves 2 and 3, FIG. 19 is a cross-sectional view taken along line X—X or Y—Y in FIG. 18, FIG. 20 is a view showing the inside structure of a modification of the upper and lower halves 2 and 3 shown in FIG. 18, FIG. 21 is a cross-sectional view taken along line Z—Z in FIG. 20, FIG. 22 is a view showing the inside structure of another modification of the upper and lower halves 2 and 3 shown in FIG. 18, and FIG. 23 is a view showing the inside structure of still another modification of the upper and lower halves 2 and 3 shown in FIG. 18.

The protrusions 40 may extend full to the corners of the upper and lower halves 2 and 3 as shown in FIG. 18. However, another component, e.g., a memory 30 shown in FIG. 1, is sometimes disposed in the space defined by the side walls 2a and 3a of the upper and lower halves 2 and 3 and the arcuate rib 32 surrounding the reel 4. In such a case, the protrusions 40 are formed only inside the arcuate rib 32 as shown in FIG. 20. Though projections 44 formed on the brake button 9 to prevent rotation of the brake button 9 and an annular rib 46 around the projections 44 are shown in FIG. 20, the projections 44 are abbreviated in FIGS. 18 and 22.

As shown in FIG. 19, the height $t_5$ of the protrusions 40 is about 0.1 to 0.5 mm. The height of the protrusions 40 may be uniform over the entire length thereof. However, since wobble of the reel 4 is larger toward the peripheral edge of the reel 4, the clearance between the reel 4 and the lower surface 2b of the top wall 2A of the upper half 2 and the clearance between the reel 4 and the upper surface 3b of the bottom wall 3A of the lower half 3 are smaller at the portion near the side walls 2a and 3a than at the portion near the center of the top wall 2A and the bottom wall 3A, and accordingly, the reel 4 can interfere with the protrusions 46 at the portion near the side walls 2a and 3a. In such a case, it is preferred that the height $t_5$ of the protrusions 40 be reduced toward the side walls 2a and 3a as shown in FIG. 21. At this time, the height $t_5$ of the protrusions 40 may be gradually reduced at a predetermined rate or reduced stepwise.

Further, though, in FIGS. 18 and 20, a single protrusion 40 extends along each of the diagonals, a pair of protrusions may be provided along each of the diagonals to extend in parallel to each other. Further, a pair of protrusions 41 and 42 which are respectively parallel to the side walls of the cartridge casing 7 may be formed on each of the upper and lower halves 2 and 3 to extend radially in addition to the protrusions 40 extending along the diagonals as shown in FIG. 22. Further, though it is possible to form four protrusions which do not extend through the center of the cartridge casing 7 and extend to form a square, it is preferred that the protrusions extend radially passing through the center of the cartridge casing 7 in order to uniform the flow of the resin in injection molding of the cartridge casing 7. Further, when two or more pairs of protrusions are provided as shown in FIG. 22, the rigidity of the cartridge casing 7 can be sufficient even if the width of each protrusion is smaller as compared with when only a pair of protrusions are provided.

Further, instead of providing such protrusions, the rigidity of the cartridge casing 7 may be increased by making larger the thickness of the top wall 2A of the upper half 2 and the bottom wall 3A of the lower half 3 toward the center of the cartridge casing 7 as shown in FIG. 23. In this case, if the thickness $t_6$ of the top wall 2A near the arcuate rib 32 or the bottom wall 3A near the arcuate rib 32 is small, sinkmarks are generated on the surface of the half opposed to the arcuate rib 32 after cooling. In order to suppress the sinkmarks, it is preferred that the wall thickness $t_6$ near the arcuate rib 32 be larger than the thickness $t_7$ of the side walls 2a and 3a. In order to suppress deformation of the cartridge casing 7 and to increase the impact strength of the cartridge casing 7, it is preferred that the corners 43 formed by the side walls 2a and 3a, the top wall 2A and the bottom wall 3A be rounded.

The cartridge casing 7 is generally formed by plastic injection molding as described above. Problems which are involved by the injection molding will be described, hereinbelow.

When the magnetic tape cartridge 1 is loaded in the recording and reproducing apparatus, the magnetic tape cartridge 1 is located with respect to the recording and reproducing apparatus on the basis of the locator holes 33 formed in the bottom wall of the cartridge casing 7 (FIGS. 9A and 9B), the outer surface of the cartridge casing 7 itself or the like. The magnetic tape cartridges 1 are sometimes arranged in a library. In order to prevent the magnetic tape cartridges 1 from being displaced from each other, the aforesaid projections 11 and the recesses 12 are formed on the cartridge casing 7 as shown in FIGS. 2 and 3. A desired magnetic tape cartridge 1 is taken out from the library and loaded in a recording and reproducing apparatus.

The injection molding is a very important technique which can form products of a complicated shape with a high dimensional accuracy at a high efficiency. However, the injection molding gives rise to a problem that a gate mark is left on the surface of the products which can obstruct loading and unloading of the magnetic tape cartridge 1 in and from the recording and reproducing apparatus and can be ground to produce plastic grindings during loading and unloading of the magnetic tape cartridge 1 depending on the position of the gate mark.

When a desired magnetic tape cartridge 1 is taken out from a library and loaded in a recording and reproducing apparatus by a chucking machine or when the magnetic tape cartridge 1 is taken out from the recording and reproducing apparatus and returned to the library by the chucking machine, the gate mark sometimes obstructs stable chucking of the magnetic tape cartridge.

Though these problems can be avoided by disposing the gate in a recess of the surface of the cartridge casing 7, flow of the resin near the gate becomes low since the wall thickness near the gate becomes smaller due to existence of the recess. As a result, uneven packing of resin is generated near the gate, the end of the flow (e.g., side walls) can sink to deteriorate the dimensional accuracy and, at the worst, short molding can occur due to a poor packing pressure. Though these problems can be avoided by providing a plurality of gates, the approach adds to the cost and is not advantageous.

Further, the problems can be avoided by providing a tunnel gate or a side gate on a side wall or the like of the cartridge casing. However, this approach is disadvantageous in that the length of the path over which the resin flows is elongated and the dimensional accuracy of the product deteriorates.

A magnetic tape cartridge which can be formed by injection molding in such a manner that fine geometric properties can be formed with a high dimensional accuracy with a single gate for each product disposed in a position where the gate mark does not interfere with loading and unloading the cartridge casing 7 in and from the recording and reproducing apparatus and with chucking of the cartridge casing 7 when the magnetic tape cartridge is taken out from and returned to a library will be described hereinbelow.

Figure 24:
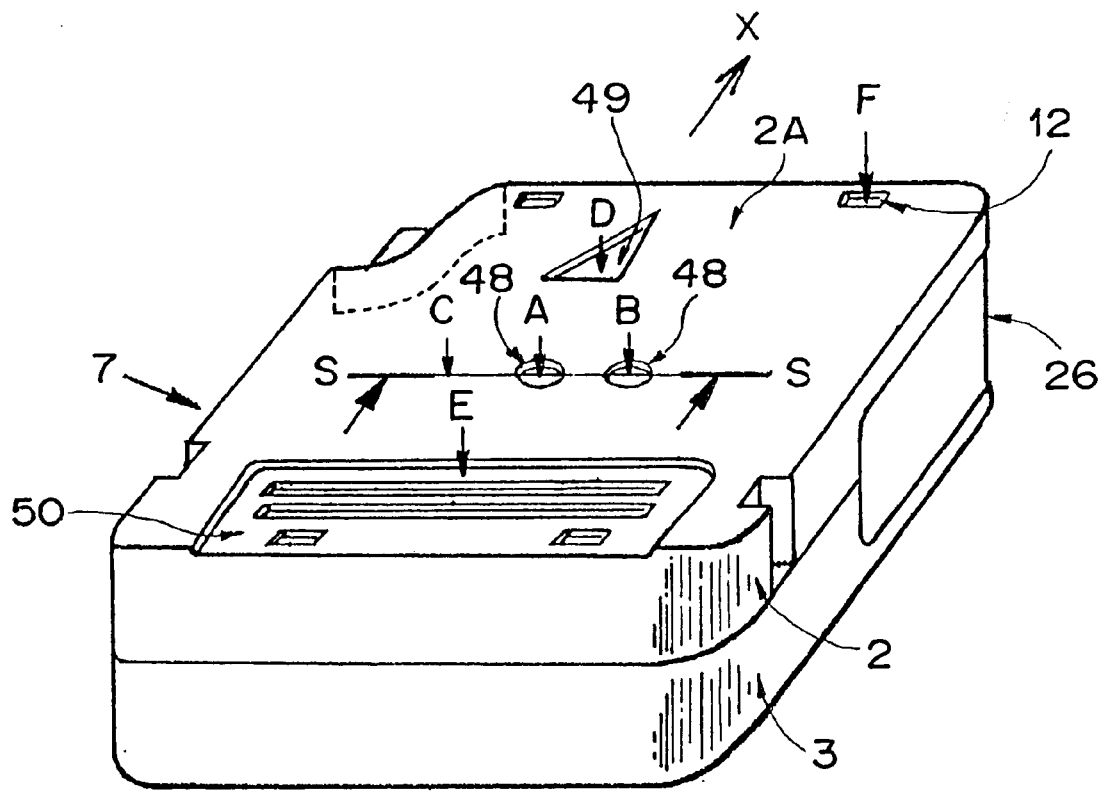
FIG. 24 is a perspective view of the cartridge casing as viewed from the side of the upper half for illustrating the position of the gate for injection molding.
Figure 25:
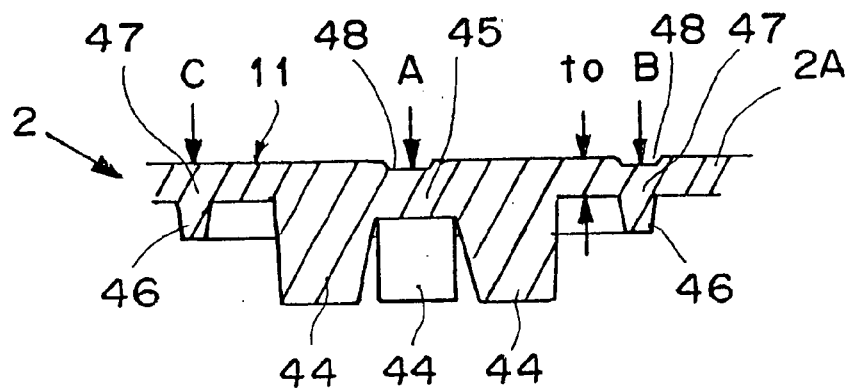
FIG. 25 is a cross-sectional view taken along line S—S in FIG. 24.

FIG. 24 is a perspective view showing an appearance of a cartridge casing 7 as viewed from the side of the upper half 2, FIG. 25 is a cross-sectional view taken along line S—S in FIGS. 20 and 24, and FIG. 25 is a perspective view showing an appearance of the cartridge casing 7 as viewed from the side of the lower half 3.

As shown in FIGS. 20 and 21, four projections 44 are erected from the lower surface of the top wall 2A of the upper half 2 at the center thereof, the part of the top wall 2A on which the projections 44 are formed and the part of the top wall 2A surrounded by the projections 44 are thickened to form a thick wall portion 45 whose wall thickness is larger than the base wall thickness to of the top wall 2A as shown in FIG. 25. Further, annular rib 46 is formed to surround the projections 44, and the part of the top wall 2A on which the annular rib 46 is formed is also thickened to form a thick wall portion 47 whose wall thickness is larger than the base wall thickness to of the top wall 2A. A recess 48 is formed on the outer surface of the central thick wall portion 45 of the top wall 2A at the center thereof indicated by arrow A (the center of the thick wall portion 45 is also the center of the top wall 2A), and a gate for injection molding is formed in the recess 48.

The recess 48 in which the gate is formed may be formed in any position on the outer surface of the thick wall portion at the center of the top wall 2A without being limited to the position indicated by arrow A. For example, the recess 48 may be formed in an area (indicated by arrow B) near to the tape draw-out opening 26 on the outer surface of the thick wall portion 47 formed by the rib 46 (an area nearer to the opening 26 than the center of the top wall 2A).

When the gate is provided in the recess 48 formed on the outer surface of the thick wall portion at the center of the top wall 2A, the path along which the resin flows during injection molding of the upper half 2 can be uniformed since the gate is positioned at the center of the top wall 2A.

Further, since the gate is in the recess 48, the gate mark cannot obstruct loading and unloading of the magnetic tape cartridge 1 in and from the recording and reproducing apparatus and taking out the magnetic tape cartridge 1 from and returning the same to a library. Further, since the recess 48 is formed in the thick wall portion, the wall thickness in the vicinity of the gate can be larger as compared with when the gate is formed in a portion other than a thick wall portion, whereby deterioration in flowability of the resin near the gate can be avoided.

When the recess 48 is formed in a position near the tape draw-out opening 26 indicated by arrow B in place of the position indicated by arrow A, the resin can be more surely supplied to an area near the opening 26, where a larger number of ribs are formed and a larger amount of resin is required, as compared with when the recess 48 is formed in a position remote from the opening 26 such as a position indicated by arrow C. When the gate is in the form of a valve gate, the whole recess 48 may be a gate. In this case, the recess 48 may be made smaller so that the gate mark becomes less remarkable.

Though the position of the gate when the upper half 2 is to be injection-molded has been described, the gate for injection-molding the lower half 3 may be formed in a recess formed on the outer surface of a thick wall portion positioned in the central portion of the bottom wall 3A of the lower half 3 outside the circular opening 13.

Figure 26:
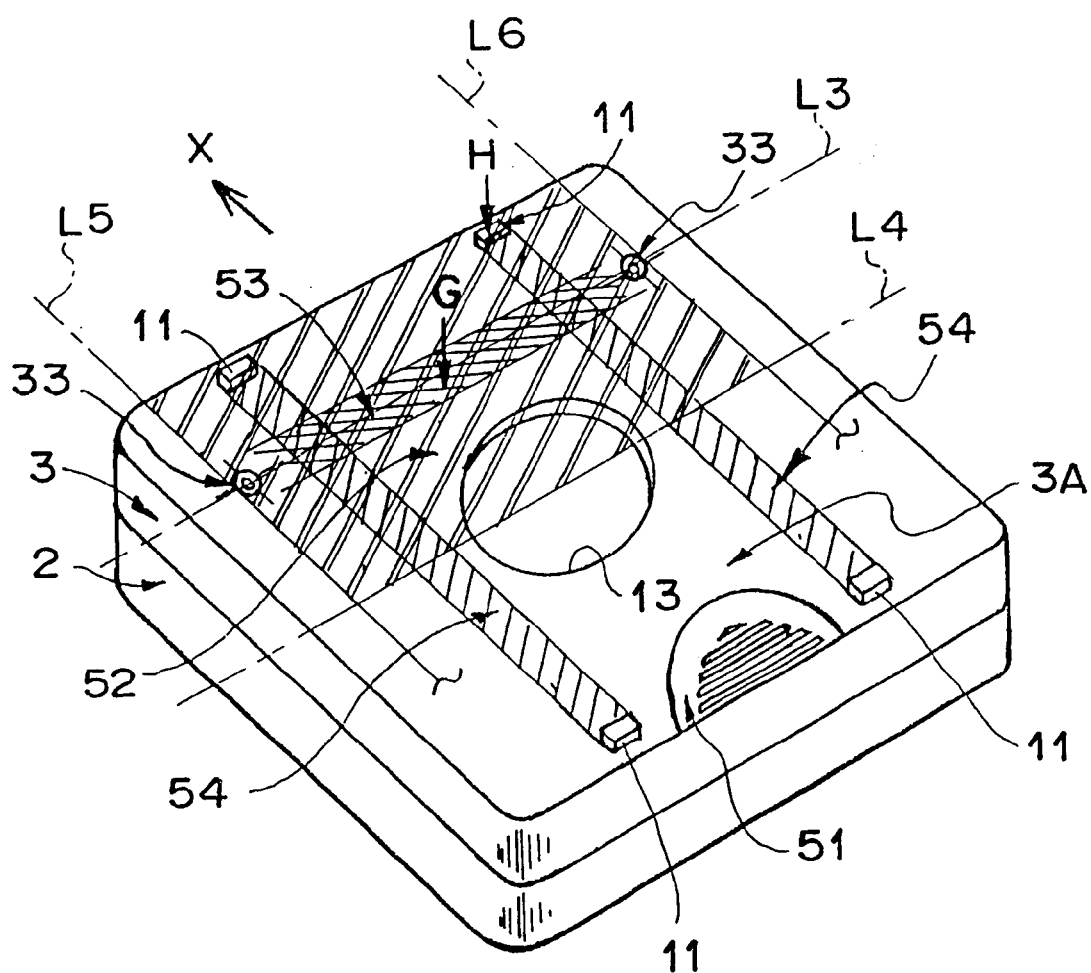
FIG. 26 is a perspective view of the cartridge casing as viewed from the side of the lower half for illustrating the position of the gate for injection molding.

In either of the upper or lower half, the gate may be formed in a recess formed for a purpose other than for providing a gate. For example, in the case of the upper half 2 shown in FIG. 24, the gate may be formed in a position indicated by arrow D in a mark 49 which is a recess for indicating the direction in which the magnetic tape cartridge 1 is to be inserted into a recording and reproducing apparatus, or in a position indicated by arrow E in a slip preventing recess 50. In the case of the lower half 3 shown in FIG. 26, the gate may be formed, for instance, in a gripping recess 51. Since these recess are inherently a recess for reasons of their function or design, use of the recesses eliminates necessity of forming an additional recess for positioning the gate.

Further, the gate may be formed in a position indicated by arrow F in one of the stacking recesses 12 of the upper half 2 shown in FIG. 24. In this case, it is preferred that the recess 12 be partly or entirely deepened so that the gate mark does not interfere with the stacking projection 11 inserted into the recess 12. The stacking projections 11 and recesses 12 need not be limited to those of the illustrated shape but may be, for instance, of a shape elongated in the direction of insertion of the cartridge casing 7.

As described above, the stacking projections 11 and recess 12 are formed on the lower half 3 and the upper half 2 so that, when a plurality of magnetic tape cartridges 1 are stacked, the stacking projections 11 on the lower half 3 of an upper magnetic tape cartridge 1 is engaged with the stacking recesses 12 on the upper half 2 of a lower magnetic tape cartridge 1 are engaged with each other to prevent the upper and lower magnetic tape cartridges 1 from being displaced relative to each other. It is needless to say that the stacking projections 11 may be formed on the upper half 2 with the stacking recesses 12 formed on the lower half 3. In this case, the gate for injection molding of the lower half 3 may be formed in one of the stacking recesses 12.

In the case where a pair of locator holes 33 for locating in place the magnetic tape cartridge 1 in the recording and reproducing apparatus are provided on the lower half 3 of the cartridge casing 7, the gate may be provided in a recess formed on the outer surface of the lower half 3 in a region 52 surrounded by a straight center line L4 which passes through the center of the lower half 3 in parallel to the straight line L3 joining the locator holes 33 and a pair of straight lines L5 and L6 extending on the outer surface of the lower half 3 through the respective locator holes 33 in perpendicular to the center line L4.

In this case, when the gate is provided in a recess formed on the outer surface of the lower half 3 at substantially the same distance from the locator holes 33, or in the central portion of an area 53 joining the locator holes 33 indicated by arrow G, the resin can be evenly supplied to both the locator holes 33 from the gate and accordingly the locator holes 33 can be formed at a high accuracy.

Further, the gate may be provided in a recess formed in the end face of a projection 11 (the end face toward which the projection 11 projects) on the lower half 3, e.g., at a portion indicated by arrow H.

Further, the gate may be provided in a region 54 on the trailing side of the projections with respect to the direction of insertion of the magnetic tape cartridge 1 into the recording and reproducing apparatus. In this case, since the region 54 is not brought into contact with the recording and reproducing apparatus due to existence of the stacking projections 11 when the magnetic tape cartridge 1 is moved in the recording and reproducing apparatus, the problems that the gate mark left on the surface of the product obstructs loading and unloading of the magnetic tape cartridge in and from the recording and reproducing apparatus and the gate mark is ground to produce plastic grindings can be avoided without forming a recess.

Figure 27:
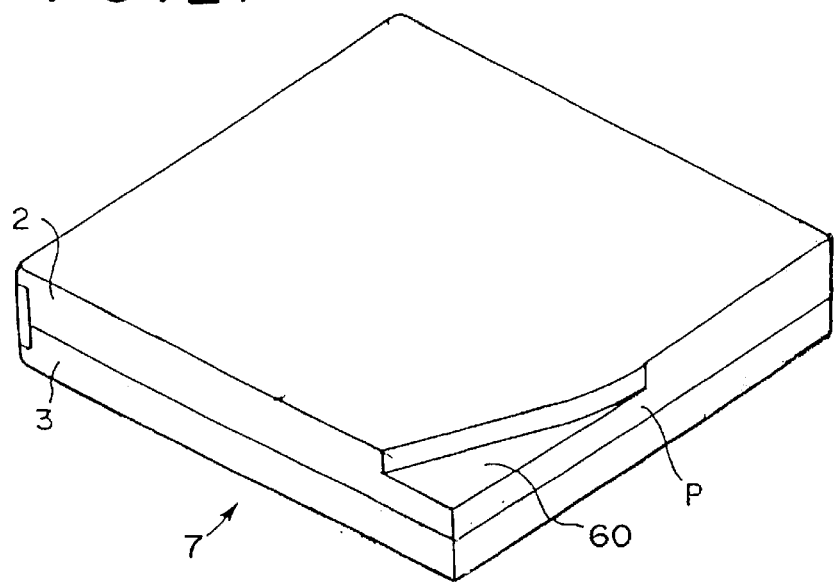
FIG. 27 is a perspective view showing a cartridge casing provided with a cutaway portion for preventing the magnetic tape cartridge from being inserted in a wrong direction.
Figure 28:
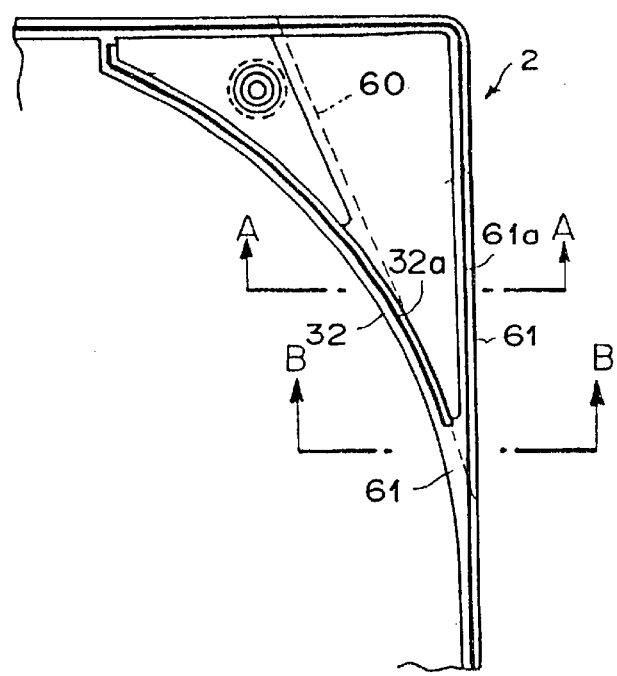
FIG. 28 is a fragmentary bottom view of the upper half of the cartridge casing shown in FIG. 27 where no measure to prevent deformation of the side wall is taken.

FIGS. 27 to 31 are views for illustrating measures to prevent deformation of the cartridge casing 7 near a cutaway portion 60 for preventing the magnetic tape cartridge 1 from being inserted into the recording and reproducing apparatus in a wrong direction. FIG. 27 is a perspective view of the cartridge casing 7, FIG. 28 is a bottom view of the corner of the upper half 2 where the measures are not taken, and FIGS. 29A and 29B are cross-sectional views respectively taken along lines A—A and B—B in FIG. 28.

The structure where the measures are not taken and the problem inherent to the structure will be first described. The end of the arcuate rib 32, which is erected from the corner of the upper half 2 to surround the reel 4 (FIG. 1) for the magnetic tape 20, merges into the side wall 61 of the upper half 2 in tangential directions of the rib 32 as shown in FIG. 28. Further, the corner of the upper half 2 is provided with a cutaway portion 60, for preventing the magnetic tape cartridge 1 from being inserted into the recording and reproducing apparatus in a wrong direction as shown in FIG. 27. The cutaway portion 60 is formed from the upper surface of the upper half 2 halfway of the height of the side wall 61 by cutting the corner of the upper half 2 in a shape like a triangle including a point near the intersection of the arcuate rib 32 and the side wall 61.

Figure 29A:
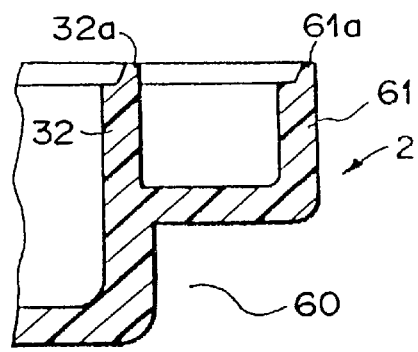
FIG. 29A is a cross-sectional view taken along line A—A in FIG. 28.
Figure 29B:
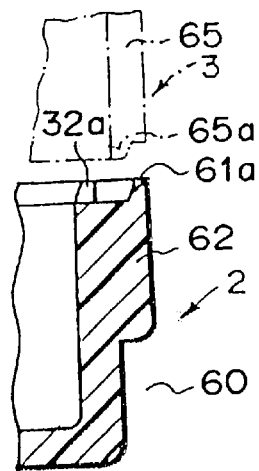
FIG. 29B is a cross-sectional view taken along line B—B in FIG. 28.

In such a case, the part of the side wall 61 (indicated at P in FIG. 27) near the intersection forms a recess at an upper half thereof (a lower half as viewed in FIGS. 29A and 29B) due to existence of the cutaway portion 60 while forming a thick wall portion 62 at a lower portion thereof as viewed in FIG. 29B.

The thick wall portion 62 is cooled slower than the surrounding parts, which results in a sinkmark and/or lean in the part of the side wall 61 indicated at P and a step on the surface to be mated with the corresponding part of the lower half 3 due to a difference in shrinkage factor and the like.

Figure 30:
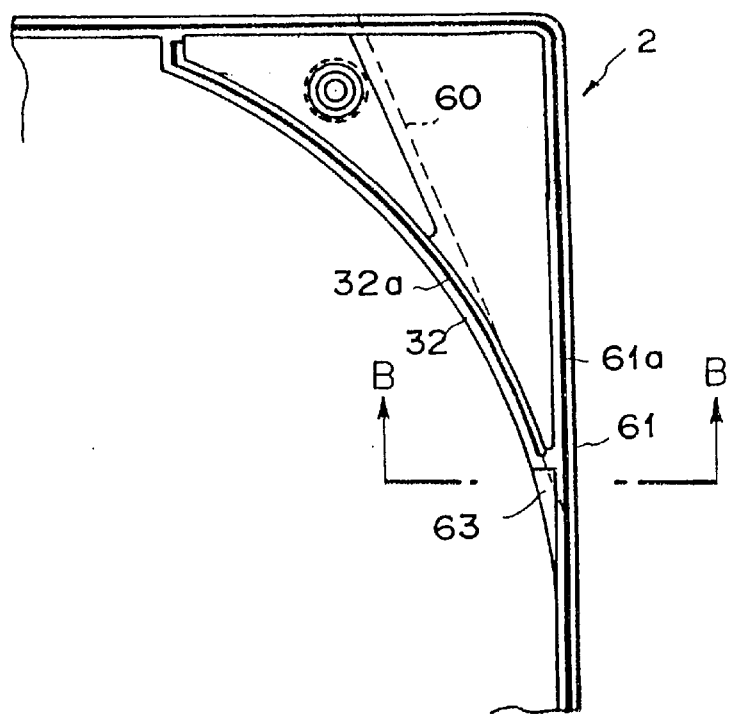
FIG. 30 is a fragmentary bottom view of the upper half of the cartridge casing shown in FIG. 27 where a measure to prevent deformation of the side wall is taken.
Figure 31:
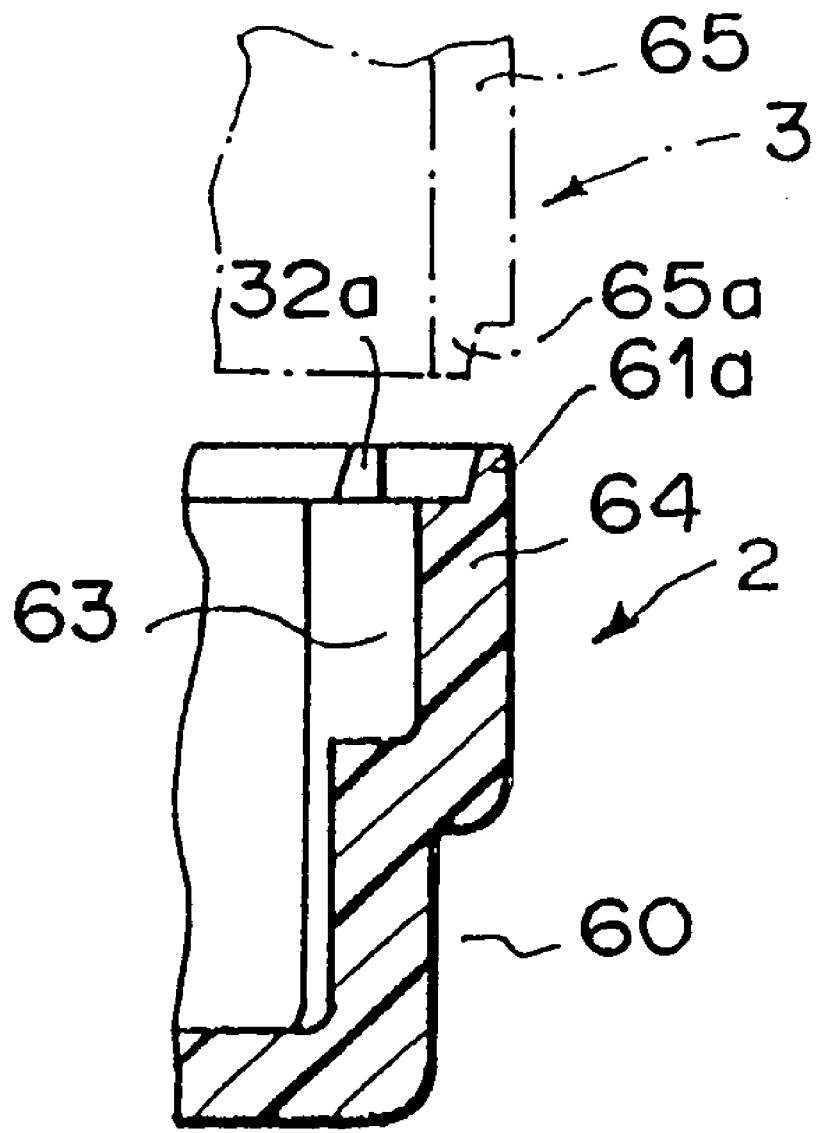
FIG. 31 is a cross-sectional view taken along line B—B in FIG. 30.

In order to overcome this problem, a thickness reduction portion 63 is formed on the back side of the side wall 61 at a part above the cutaway portion 60 so that the part forms a thin wall portion 64 the wall thickness of which is substantially equal to that at the cutaway portion 60 as shown in FIG. 30 and FIG. 31, which is a cross-sectional view taken along line B—B in FIG. 30.

In order to ensure dust-tightness, the butt end 61a of the side wall 61 of the upper half 2 to the side wall 65 of the lower half 3 forms a socket joint together with the butt end 65a of the side wall 65 of the lower half 3 as shown in FIGS. 29B and 31. So the butt end 32a of the rib 32 of the upper half 2 to the rib (not shown) of the lower half 3 is.

By thus forming a thickness reduction portion 63 on the back side of a portion of the side wall 61 adjacent to the cutaway portion 60 in the direction of height of the side wall 61, the difference in cooling rate near the aforesaid intersection can be substantially nullified during injection molding, whereby formation of a sinkmark and/or lean in the part near the intersection is prevented and formation of a step on the surface at which the upper and lower halves 2 and 3 are mated is prevented.

Though, in the illustrated arrangement, the cutaway portion 60, for preventing the magnetic tape cartridge 1 from being inserted into the recording and reproducing apparatus in a wrong direction, is formed on the upper half 2, the same measures can be taken if the cutaway portion 60 is formed on the lower half 3 halfway of the height of the side wall from the bottom surface of the lower half 3.

In addition, all of the contents of Japanese Patent Application Nos. 10(1998)-133544, 10(1998)-149285, 10(1998)-158745, 10(1998)-176064 and 10(1998)-219994 are incorporated into this specification by reference.

What is claimed is:

1. A magnetic tape cartridge comprising a cartridge casing formed of upper and lower halves which are formed by plastic injection molding and are fixed together and a single reel which is housed in the cartridge casing for rotation and around which a magnetic tape is wound, wherein the improvement comprises that a pair of locator holes for locating the magnetic tape cartridge with respect to a recording and reproducing apparatus when the magnetic tape cartridge is loaded in the recording and reproducing apparatus are provided on the bottom surface of the lower half of the cartridge casing, and a gate for injection molding is provided in a recess formed on the bottom surface of the lower half in a region surrounded by a straight center line which passes through the center of the bottom surface of the lower half in parallel to the straight line joining the locator holes and a pair of straight lines extending on the bottom surface of the lower half through the respective locator holes in perpendicular to the center line.

* * * * *